(12) United States Patent
Gerken et al.

(10) Patent No.: US 11,980,882 B2
(45) Date of Patent: May 14, 2024

(54) HANDHELD FLUID TRANSFER APPARATUS, LABORATORY SYSTEM COMPRISING THE HANDHELD FLUID TRANSFER APPARATUS, AND METHOD FOR OPERATING A HANDHELD FLUID TRANSFER APPARATUS OR THE LABORATORY SYSTEM

(71) Applicant: Eppendorf SE, Hamburg (DE)

(72) Inventors: Jens Gerken, Hamburg (DE); Christian Eggert, Lubeck (DE); Tobias David, Bargteheide (DE); Wolfgang Goemann-Thoss, Hamburg (DE); Peter Schmidt, Lubeck (DE); Uwe Dunker, Hamburg (DE); Philip Muller, Hamburg (DE)

(73) Assignee: EPPENDORF SE, Hamburg (DE)

( * ) Notice: Subject to any disclaimer, the term of this patent is extended or adjusted under 35 U.S.C. 154(b) by 1250 days.

(21) Appl. No.: 16/483,398

(22) PCT Filed: Feb. 2, 2018

(86) PCT No.: PCT/EP2018/052636
§ 371 (c)(1),
(2) Date: Aug. 2, 2019

(87) PCT Pub. No.: WO2018/141898
PCT Pub. Date: Aug. 9, 2018

(65) Prior Publication Data
US 2020/0009547 A1  Jan. 9, 2020

(30) Foreign Application Priority Data
Feb. 3, 2017 (EP) .................................. 17154629

(51) Int. Cl.
*B01L 3/02* (2006.01)
*G06F 3/01* (2006.01)
*G06F 3/0346* (2013.01)

(52) U.S. Cl.
CPC ............ *B01L 3/0237* (2013.01); *G06F 3/017* (2013.01); *G06F 3/0346* (2013.01);
(Continued)

(58) Field of Classification Search
CPC ............... B01L 3/0237; B01L 2300/02; B01L 2300/027; B01L 2300/06;
(Continued)

(56) References Cited

U.S. PATENT DOCUMENTS 4,780,833 A   10/1988   Atake
6,573,883 B1   6/2003   Bartlett
(Continued)

FOREIGN PATENT DOCUMENTS

EP   0334744 B1   9/1992
EP   2353065 A1   8/2011
(Continued)

OTHER PUBLICATIONS

English translation for EP-2907575-A1 (Year: 2015).*

*Primary Examiner* — Alesa Allgood
*Assistant Examiner* — Byung Ro Lee
(74) *Attorney, Agent, or Firm* — Todd Lorenz

(57) ABSTRACT

Provided is a handheld fluid transfer apparatus, more particularly a pipette or repeater pipette, and a laboratory system comprising the handheld fluid transfer apparatus, which comprises: a control apparatus, which comprises a data processor capable to execute a control program for controlling at least one electronically controllable function of the handheld fluid transfer apparatus using input data, a user interface device for receiving a user input, the user (Continued)

interface device comprising a motion sensor device for measuring motion data of the handheld fluid transfer apparatus and for providing at least one motion data sequence, which contains subsequently measured motion data, a motion data memory for storing the at least one motion data sequence, an evaluation device being configured to determine the input data in dependence on the evaluation of the at least one motion data sequence. A method is provided for operating the fluid transfer apparatus or the laboratory system.

14 Claims, 7 Drawing Sheets

(52) U.S. Cl.
CPC ..... *B01L 2300/02* (2013.01); *B01L 2300/027* (2013.01); *B01L 2300/06* (2013.01); *B01L 2300/0627* (2013.01); *B01L 2300/0832* (2013.01); *B01L 2400/0478* (2013.01)

(58) Field of Classification Search
CPC ..... B01L 2300/0627; B01L 2300/0832; B01L 2400/0478; B01L 2200/087; B01L 2300/023; B01L 2300/0663; B01L 3/0286; G06F 3/017; G06F 3/0346; G06F 3/04847
USPC ...................................................... 73/864.21
See application file for complete search history.

(56) References Cited

U.S. PATENT DOCUMENTS

| | | |
|---|---|---|
| 2002/0011990 A1* | 1/2002 | Anwar .................. G06F 3/1228 345/173 |
| 2008/0269584 A1 | 10/2008 | Shekalim |
| 2009/0052785 A1 | 2/2009 | Shamaie |
| 2009/0139351 A1 | 6/2009 | Reichmuth |
| 2009/0303204 A1 | 12/2009 | Nasiri |
| 2010/0208299 A1 | 8/2010 | Sakuda |
| 2010/0214216 A1 | 8/2010 | Nasiri |
| 2011/0163955 A1 | 7/2011 | Nasiri |
| 2011/0181272 A1 | 7/2011 | Andres et al. |
| 2012/0291567 A1 | 11/2012 | Homberg et al. |
| 2013/0192715 A1 | 8/2013 | Zehnder |
| 2013/0265225 A1 | 10/2013 | Nasiri |
| 2013/0266952 A1 | 10/2013 | Goemann-Thoss |
| 2013/0288382 A1 | 10/2013 | Andres et al. |
| 2014/0308750 A1* | 10/2014 | Reichmuth ............. B01L 3/021 436/180 |
| 2016/0299577 A1* | 10/2016 | Trau ....................... G16H 50/20 |
| 2017/0108521 A1 | 4/2017 | Sasaki |

FOREIGN PATENT DOCUMENTS

| | | | |
|---|---|---|---|
| EP | 2907575 A1 * | 8/2015 | ................ B01L 3/02 |
| WO | WO 2005053848 A1 | 6/2005 | |
| WO | WO-2012135963 A1 * | 10/2012 | ........... E21B 47/024 |

* cited by examiner

M1

M2

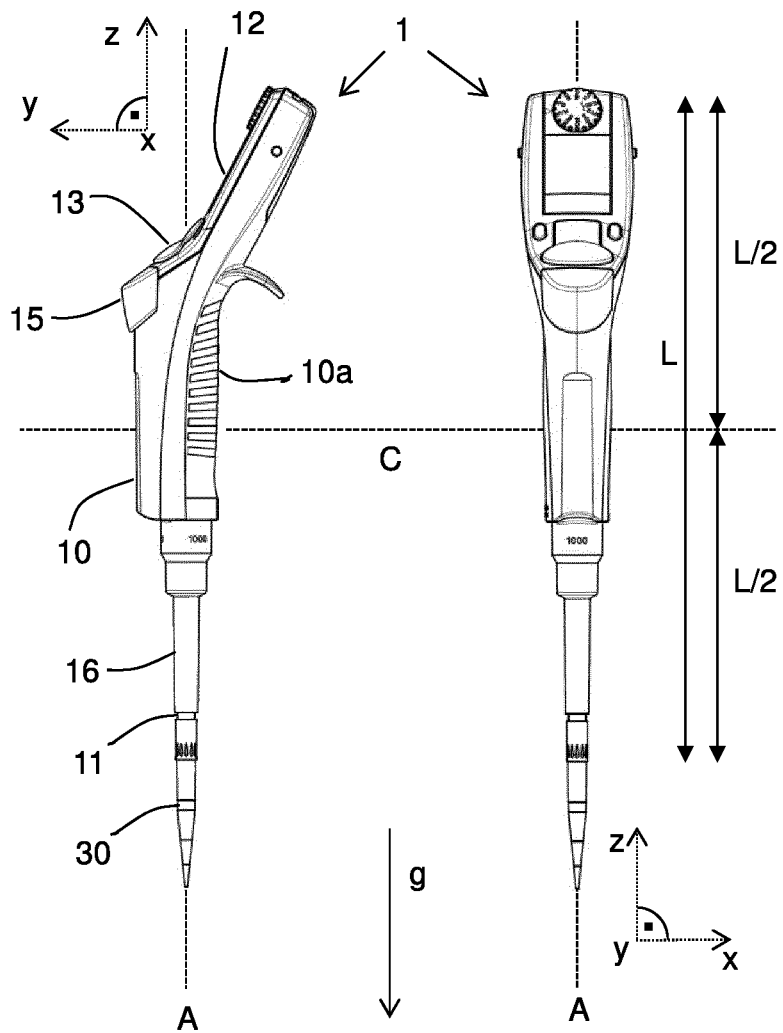

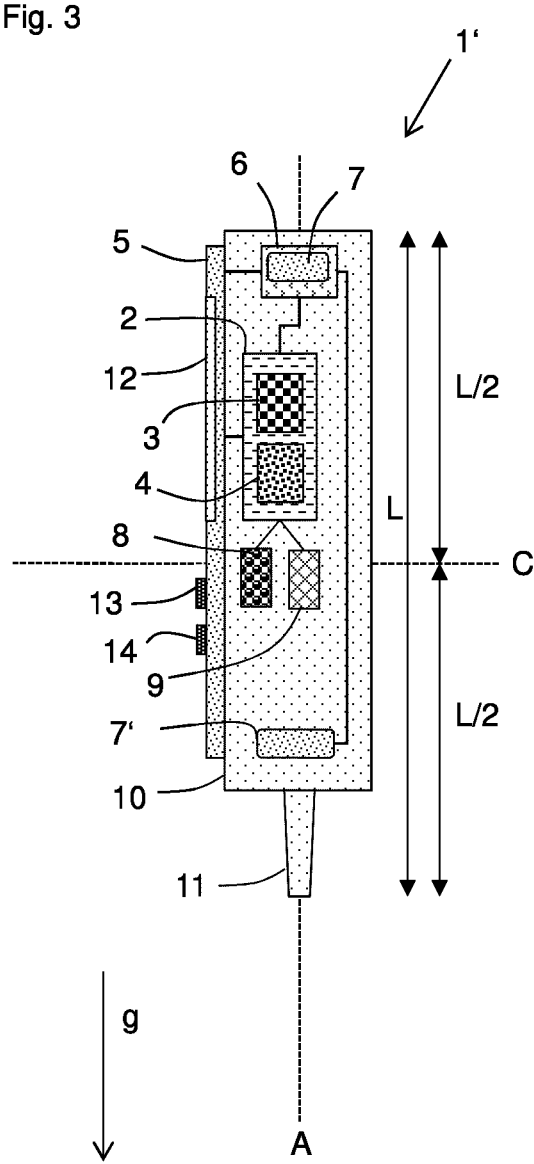

HANDHELD FLUID TRANSFER APPARATUS, LABORATORY SYSTEM COMPRISING THE HANDHELD FLUID TRANSFER APPARATUS, AND METHOD FOR OPERATING A HANDHELD FLUID TRANSFER APPARATUS OR THE LABORATORY SYSTEM

CROSS REFERENCE TO RELATED APPLICATIONS

This is the National Stage filed under 35 U.S.C. § 371 of International Application PCT/EP2018/052636 filed on Feb. 8, 2018, which claims priority from European Patent Application No. EP17154629.4 filed on Feb. 3, 2017, the contents each of which are incorporated herein by reference.

The invention relates to a handheld fluid transfer apparatus, a laboratory system comprising the handheld fluid transfer apparatus and to a method for operating the handheld fluid transfer apparatus or the laboratory system.

Such handheld fluid transfer apparatuses are usually used in medical, biological, biochemical, chemical and other laboratories. They are used in the laboratory for transporting and transferring fluid samples having small volumes, particularly for the precise metering of the samples. In handheld fluid transfer apparatuses, liquid samples, for example, are aspirated by means of underpressure into pipette containers, e.g. pipette tips, are stored there and are delivered from them again at the destination. A handheld fluid transfer apparatus uses at least one control parameter, in particular operating parameter, which at least influences or controls the operation of at least one function of the fluid transfer apparatus. Handheld fluid transfer apparatuses are subsequently also referred to by the term "fluid transfer apparatuses" for short.

The fluid transfer apparatuses include handheld pipettes and dispensers, for example. A pipette is understood to mean an appliance in which a movement device which is associated with the appliance and which may have a piston, in particular, can be used to aspirate a sample to be pipetted into a pipetting container that is connected to the pipette. In the case of an air-cushion pipette, the piston is associated with the appliance, and the sample to be pipetted and the end of the piston have an air cushion between them which, when the sample is admitted into the pipetting container, is under an underpressure which aspirates the sample into the pipetting container. A dispenser is understood to mean an appliance in which a movement device, which may have a piston, in particular, can be used to aspirate a volume to be pipetted into a pipetting container that is connected to the dispenser, the movement device being at least partially associated with the pipetting container, for example by virtue of the piston being arranged in the pipetting container. In the case of the dispenser, the end of the piston is very close to the sample to be pipetted or is in contact therewith, for which reason the dispenser is also referred to as a direct displacement pipette.

In the case of a fluid transfer apparatus, the quantity of sample delivered by a single operating action can correspond to the quantity of sample aspirated into the appliance. Alternatively, provision may be made for an admitted quantity of sample which corresponds to a plurality of delivery quantities to be delivered again in steps. In addition, a distinction is drawn between single channel fluid transfer apparatuses and multichannel fluid transfer apparatuses, with single-channel fluid transfer apparatuses containing only a single delivery/admission channel, and multichannel fluid transfer apparatuses containing a plurality of delivery/admission channels which allow a plurality of samples to be delivered or admitted in parallel, in particular. Fluid transfer apparatuses may be manually operated, in particular, i.e. can imply that the driving of the movement device is produced by the user, and/or may be electrically operated, in particular. Even in the case of manual operation of the movement device, a fluid transfer apparatus may be an electric fluid transfer apparatus, for example by virtue of the current delivery volume or at least another operating parameter being selected electrically.

Examples of handheld, electronic pipettes are the Eppendorf Xplorer® and the Eppendorf Xplorer® plus from Eppendorf AG, Germany, Hamburg; examples of handheld, electronic dispensers are the Multipette® E3 and the Multipette® E3x from Eppendorf AG, Germany, Hamburg.

Electric fluid transfer apparatuses afford numerous advantages over non-electric fluid transfer apparatuses, since a multiplicity of functions can easily be implemented, which may enhance the functionality of the apparatuses. Computer implemented functions, which are controlled by control parameters, allow, in particular, an automation of pipetting tasks. Any operation of the fluid transfer apparatus may be configured to be influenced by a user. Operation parameters may be provided to define a particular automatic or semi-automatic operation, and operation parameters may be defined, or at least influenced or altered by the user through a user interface device of the fluid transfer apparatus. For this purpose, a user interface apparatus may comprise one or more conventional input devices like wheels, buttons, switches, touchscreens and the like. Under ergonomic considerations it is important to avoid overburden of the user when operating the handheld fluid transfer apparatus. Some fluid transfer apparatuses require two hands of the user when setting operation parameters, while a one-handed usability of such apparatuses is to be preferred, in general. The present invention is based on the finding that the workflow of working on laboratory sample may be delayed in many situations, even when the fluid transfer apparatus is configured for a one-handed usability.

It is an object of the present invention to provide a handheld fluid transfer apparatus and a method for operating the handheld fluid transfer apparatus which the user can use conveniently.

The invention achieves this object by means of the fluid transfer apparatus according to Claim 1 and the method according to Claim 14. Preferred embodiments are covered by the sub-claims, in particular.

The idea underlying the present invention is that the overall fluid transfer apparatus is used as the input device, which is capable to replace, at least by choice of the user, the functionality of one or more conventional input devices, for example, of a dial wheel and/or a selection rocker. This is achieved by storing at least one motion data sequence, either in the fluid transfer apparatus or in an external data processing apparatus, thereby allowing a detailed evaluation of the motion, which was performed by a user by moving the fluid transfer apparatus with the intention to input specific information, in particular during a motion input mode of the handheld fluid transfer apparatus. In application studies performed by the inventors it was found that applicants appreciate the utilization of the fluid transfer apparatus as an ergonomic input device. According to the test person's experiences, the handheld fluid transfer apparatus, which typically is a lightweight device, can be moved in an intuitive manner for performing a defined path of motion. Such a path can be measured and stored as the at least one motion data sequence.

The user interface device of the fluid transfer apparatus according to the invention is acting as a multifunctional input device for the input of information according to the requirements of the control program. The control apparatus comprises a data processor capable to execute a control program for controlling at least one electronically controllable function of the handheld fluid transfer apparatus using input data, preferably for controlling at least two electronically controllable functions of the handheld fluid transfer apparatus using input data, and most preferably for controlling a plurality of electronically controllable functions of the handheld fluid transfer apparatus using input data. This way, the user interface device is efficiently replacing a plurality of conventional input devices, acting as a general input device for the input of any information according to the requirements of the control program.

In particular, the control apparatus comprises a data processor capable to execute a control program for controlling at least one electronically controllable function of the handheld fluid transfer apparatus in dependence on control data. The input data may be used to control the electronically controllable function, preferably such that the electronically controllable function is dependent on the operating parameter, which is defined by the input data, thereby acting as control data. Moreover, the electronically controllable function may be configured to use the input data, e.g. for transforming and/or storing the input data, and/or for sending the input data to an external data processing device, and/or for sending the input data to a data storage device.

The fluid transfer apparatus may provide one or multiple input operating modes, during which the control apparatus is configured to receive user input via one or more conventional input devices of the fluid transfer apparatus. A motion input mode, in the context of the present invention, is, in particular exclusively, referring to the situation of a user input via the motion sensor device of the user interface device of the fluid transfer apparatus. Any further input devices of the user interface device are preferably not influenced by the activation or deactivation of the motion input mode. The motion input mode is an optional operation mode of the fluid transfer apparatus. During the period of activity of the motion input mode, the measurement of the motion data, in particular the at least one motion data sequence, is performed and the at least one motion data sequence is stored in the motion data memory. It is possible that the fluid transfer apparatus provides an operating mode and/or an input operating mode and/or the motion input mode at least temporarily simultaneously, in particular depending on the control program.

The start and/or the end of the motion input mode is preferably triggered by the user by way of an activity input device, which may be or comprise an activity button. Triggering the activity input device may start and/or end the motion input mode. For example the user may start the motion input mode by actuating the activity input device, and the user may end the motion input mode by actuating the activity input device once more. Preferably, the control apparatus, in particular the control program, is configured to control the activity/inactivity of the motion input mode by detecting the status of the activity input device.

However, it is also possible that the activation and/or the deactivation of the motion input mode is triggered by the control program of the control apparatus, in particular without any user action required. For example, the control program may be configured to automatically trigger the deactivation in dependence on the at least one motion data sequence, which was measured before, or the control program may be configured to automatically trigger the deactivation in dependence on a time period, which determines the duration of the motion input mode.

The control program may be configured to automatically trigger the deactivation in dependence on the at least one motion data sequence, which was measured before. The evaluation device may detect that any predefined condition, in dependence on the at least one motion data sequence, was fulfilled such that the motion input mode is automatically ended. The predefined condition may be that an evaluation process performed by the evaluation device on the at least one motion data sequence—as measured and subsequently temporarily stored by the fluid transfer apparatus—has a specific result. The predefined condition may be that the comparison of the at least one motion data sequence—as measured and subsequently temporarily stored by the fluid transfer apparatus—with the motion patterns, in particular gestures, as stored in a motion data library, has a specific result. Such result may be a match between the at least one motion data sequence, as measured, with one of the motion patterns stored in the motion data library. The result may also be that an error was found by the evaluation process, for example, the evaluation may conclude that the signal quality of the motion data is insufficient to reliably perform a comparison of the at least one motion data sequence. This may happen when, after manually triggering the start of the motion input mode, no motion is detected at all or the motion is changing too fast or too slow.

The control program may be configured to automatically trigger the deactivation in dependence on a time period $T_{iom}$, which determines the duration of the motion input mode. The time period may depend on the specific electronically controllable function of the fluid transfer apparatus, which is to be controlled by input data derived from the at least one motion data sequence. The time period $T_{iom}$ may be chosen from one of the preferred ranges 0.5 s$<=T_{iom}<=$10.0 s, 0.5 s$<=T_{iom}<=$20.0 s, 0.5 s$<=T_{iom}<=$30.0 s, 0.5 s$<=T_{iom}<=$40.0 s, 0.5 s$<=T_{iom}<=$50.0 s, 0.5 s$<=T_{iom}<=$60.0 s, 0.5 s$<=T_{iom}<=$5.0 s, 0.5 s$<=T_{iom}<=$4.0 s, 0.5 s$<=T_{iom}<=$3.0 s, 0.5 s$<=T_{iom}<=$2.0 s wherein s means "seconds". The fluid transfer apparatus, preferably, is configured to receive a user input to define the time period $T_{iom}$. The control apparatus, in particular the control program, may be configured to let the user input the time period $T_{iom}$ via the user interface device of the fluid transfer apparatus. The short time periods $T_{iom}$ allow to maintain a smooth workflow.

Preferably, the activity input device may comprise a mechanically movable element, e.g. a button, a lever, a rocker, or a wheel, comprising a mechanically movable contact surface. The activity input device may have a first position and a second position, wherein in the first position, the motion input mode may be deactivated, and in the second position, the motion input mode may be active. The activity input device may have a spring supported contact surface, which may be pressed by a user to change from the first to the second position. When the user releases the spring supported contact surface, the spring will return the contact surface back to the first position. When the motion input mode is deactivated, preferably no motion data will be measured and/or preferably no motion data sequence will be stored.

It is also possible and preferred that the activity input device does not contain a mechanically movable contact surface, for example, by way of a touch-sensitive contact surface, e.g. implemented by a capacitive sensor field. In this case, but not limited to this case, it is particularly advantageous to provide a signal device to give a feedback to the user regarding the manual triggering of the activity input device.

Preferably, the fluid transfer device has a signal device for signalling to the user the manual triggering of the activity input device and/or for signalling to the user the activity and/or inactivity of the motion input mode. The signal device may be configured to present at least one first signal to the user corresponding to the inactivity, and at least one second signal corresponding to the activity of the motion input mode. The second signal may be signalled for a predetermined time period at the begin of the activity of the motion input mode, the first signal may be signalled for a predetermined time period at the begin of the inactivity of the motion input mode. Or, the second signal may be signalled substantially during the whole time period of the activity of the motion input mode, the first signal may be signalled substantially during the whole time period of the inactivity of the motion input mode. The signal device may be configured to present an optical and/or acoustical signal to the user. The signal device, preferably, comprises an optical signal device, e.g. at least one LED, and/or an acoustic output device, e.g. a speaker. It is possible and preferred that the fluid transfer device, in particular the user interface device comprises at least one display device, including or consisting of a display screen, wherein the display device is configured to—at least in addition or exclusively—work as the signal device. A display screen typically shows information represented by symbols, e.g. letters, words, graphic icons, which are displayed on a background. The background preferably is represented such that the symbols are easily readable for a user. The background and/or the symbols may have a specific color and or brightness, in particular, depending on the activity and/or inactivity of the motion input mode. The first signal may be represented by a first color and/or first brightness of the background and/or the symbols, the second signal may be represented by a second color and/or second brightness, which is different from the first color and/or first brightness. Using the whole area of the display screen or at least a part of the display screen as the signal device is a reliable way to inform the user on the input mode, in an intuitive way.

The signal device may be configured to be utilized for additional or alternative purpose, for example, for signalling to a user that a predetermined gesture was successfully recognized or not recognized by a motion gesture recognition system, and or to give a real-time feedback to the motion pattern applied by the user.

In one preferred embodiment of the invention, the fluid transfer apparatus is configured to implement a motion recognition system, in particular a motion gesture recognition system, using the user interface device, wherein a specific motion, respectively a gesture, is linked, in particular, with a specific electronically controllable function of the fluid transfer apparatus, in particular linked to the definition or selection of control data, in particular to the definition or selection of an operation parameter and/or linked to the control of a pipetting process, e.g. by starting or stopping a fluid transfer. In this context, the motion recognition system is configured to identify a motion pattern by comparing the at least one motion data sequence, which was measured and was—at least temporarily-stored in the motion data memory, with motion patterns contained in a motion data library, which is preferably stored in a motion data library memory, located preferably in the fluid transfer apparatus—or alternatively, in an external data processing apparatus. Preferably, the evaluation device is configured to access a motion data library, which contains predetermined motion pattern, e.g. gestures, in the form of motion pattern data, e.g. gesture data, contained in a database of motion pattern.

The database of predetermined motion patterns may comprise a data table, which links the individual predetermined motion patterns with a pattern-specific predetermined identification code, and the identification code may be used as the input data or control data. For example, the control apparatus may comprise another table, which correlates the identification code with any predetermined further control data, which may depend on the context of the control program, in particular depend on the operating mode of the fluid transfer apparatus. For example, an individual user motion, for example "tilt forward around a horizontal x-axis", may be interpreted, in a first context, as a control signal for starting a dispensing step of discharging liquid sample form a sample transfer container connected to the fluid transfer apparatus, and may be interpreted, in a second context, as a control signal for responding with "yes" to a yes-or-no-query, which was directed to the user via a graphical user interface shown on a display screen of the user interface device.

In particular with regard to the implementation of a motion gesture recognition system, the evaluation device preferably comprises an evaluation program code, which is configured * to let a data processor access a motion data library memory, which is preferably included by the fluid transfer apparatus and which contains a database of motion pattern, in particular gesture profiles, * to compare the at least one motion data sequence measured by the motion sensor and * to determine whether there is a match. Various algorithms and models can be used to effectively match gesture data with gesture profiles. Preferably, a Hidden Markov Model ("HMM") is used to recognize the gestures. Herein, the gesture data can be broken into sequential symbols. The HMM is a mathematical model which describes a complex system in terms of a finite set of possible system states, with statistical information representing the probability of each possible transition from one state to another. Therefore, using an HMM system, the data processor can break the gesture data down into subparts and compare them with gesture profile information to determine a probability of a match.

Various schemes of motion patterns, in particular gestures, are ideally used to enable users to accurately produce recognizable gestures by way of the fluid transfer apparatus, and to enable the data processor to correctly interpret the at least one motion data sequence. For example, natural gestures can be used which correspond to natural responses a user might perform. For example, moving the tilt angle of the fluid transfer apparatus towards the vertical, in particular while fixating the lower end of the body of the fluid transfer apparatus, may imitate the gesture of pouring out a liquid from a container, and may be used to start a discharging of a liquid sample from a sample transfer container mounted at the fluid transfer apparatus during a pipetting process. The opposite motion may be used to aspirate the sample during a pipetting process.

Preferably, the motion data library contains such predetermined motion patterns, which can be easily distinguished by the motion gesture recognition system.

Preferably, a predetermined motion pattern contains one or more sub-patterns of motion. For example, a predetermined motion pattern may comprise a first sub-pattern including a translational motion, followed by a second sub-pattern including a translational motion in a different direction, or vice versa.

Preferably, a predetermined motion pattern or sub-pattern corresponds to a rotation of at least one motion sensor, preferably around a single rotation axis. The rotation may be also characterized by the angle enclosed by the rotation. Preferably, a predetermined motion pattern or sub-pattern corresponds to a translation of at least one motion sensor, preferably along a single axis. Preferably, a predetermined motion pattern corresponds to a curved motion of at least one motion sensor, preferably a curved motion within a plane or in all three dimensions. Gesture movements can be made in either one, two, or three dimensions. The user can make gestures from a center point in space toward the sides, top, bottom, and corners, and optionally then back again to a center point.

Preferably, a user may need to provide input to the control apparatus in the form of a numeral response, a character response or any other sign. The motion gesture recognition system may be configured to recognize a numeral and/or a character.

In embodiments in which a gesture in the form of a binary response, i.e. "1" or "0", such as a "yes" or "no" is desirable, a simple and easily reproduced and interpreted motion pattern can be used. In one example, a simple up and down motion of the fluid transfer apparatus can be used to produce a "1" response. Additionally, a side to side motion can be used to indicate a "0" response. Alternatively, a tilt of the fluid transfer apparatus in a positive rotation direction may be used to indicate a "1" information, and a tilt motion in the opposite direction may be used to indicate a "0" information. Such responses are natural responses corresponding to a typical yes or no. They are thus intuitive, but also easy to produce accurately and conducive to a high accuracy of proper interpretation.

The information "1" or "0" may be interpreted by the control apparatus as a response to a query, which is directed to the user e.g. via a display screen of the user interface device. A binary information is suitable to select or deselect a proposed parameter in a graphical user interface shown in the display screen, or to move in a direction "up", "down", "left", "right" in a manner defined by the structure of the graphical user interface, for example to move through a list of possible values for an operation parameter, which is to be defined by the user. In certain operating modes of the fluid transfer apparatus, the binary information may directly start or stop a function related to the pipetting process, e.g. starting the aspiration or discharge of a sample or stopping the same.

Moreover, the input of the user via the motion sensor device may be interpreted by the control apparatus in combination with the input from a conventional input device of the user interface device, for determining the control data for influencing the electronically controllable function. This way, for example, a fine tuning of an operating parameter may be implemented.

In certain operating modes, a gesture along a full or partial circular path may be used to navigate stepwise through a user menu or list shown in the graphical user interface, wherein a single circular motion may be interpreted as a "next" operation.

In certain operating modes, a gesture being a tilt in a first direction or around a first rotation axis may be used to scroll in a first screen direction through a user menu or a list shown in the graphical user interface, wherein the tilt in the direction opposite the first direction may be used to scroll in the opposite screen direction.

In certain operating modes, a gesture comprising a shaking motion may be interpreted to erase the previous input and prepare for a new input.

Preferably, the motion measured by the motion sensor device is a motion of the fluid transfer apparatus, or of one or more motion sensors, carried out by a user along an axis, in particular a non-horizontal or vertical axis, in a plane of a Cartesian coordinate system, or is a three-dimensional motion in the space defined by the three axis x, y and z of a Cartesian coordinate system. Preferably, the motion sensor device is configured for measuring said type of motion.

The control apparatus may be configured to signal by way of a signal device of the fluid transfer apparatus that a motion pattern was recognized, or was not recognized. This further improves the usability of the user interface device of the fluid transfer apparatus based on gesture recognition. The specific signal, which is put out by the signal device, may depended on the result of the evaluation of the at least one motion data sequence.

The control apparatus may be configured to signal by way of a signal device of the fluid transfer apparatus that a sub-motion pattern was recognized, or was not recognized. The specific signal, which is put out by the signal device, may depended on the result of the evaluation of the at least one motion data sequence. This way, the user may be trained to imitate the predetermined motion patterns in the correct way.

The control apparatus may be configured to signal by way of a signal device of the fluid transfer apparatus that the motion data contained in the at least one measured motion data sequence meet a predetermined criterion, for example, that the acceleration, rate or speed of the fluid transfer device matches a predetermined range of accelerations or speeds, or that the acceleration, rate or speed of the fluid transfer device exceeds a predetermined lower or upper limit, preferably in real-time. This way, a qualification feedback can be provided for the user to allow estimating the user performance during the motion, and the user may be trained to imitate the predetermined motion patterns in the correct way.

The motion data library memory, is located preferably in the fluid transfer apparatus—or alternatively, in an external data processing apparatus. The motion data library memory, preferably, is a volatile memory for temporarily storing the at least one motion data sequence. However, it is also possible and preferred that the motion data library memory is a non-volatile memory for allowing a permanent storage of the motion data sequences, or that a non-volatile memory is provided in addition to a volatile memory. The non-volatile memory may be part of the fluid transfer apparatus or of an external data processing apparatus. The fluid transfer apparatus may comprise at least one physical data memory, in particular a volatile memory, which serves as motion data memory, input data memory, memory for any other data. The fluid transfer apparatus my comprise at least one physical data memory, in particular a non-volatile memory, e.g. a FLASH memory, which serves as motion data memory, input data memory, motion data library memory, memory for any other data.

It is preferred to configure the control apparatus such that a user is authenticated, in particular by an authorization process using the user interface device, or by any other authentication device, e.g. a finger print sensor integrated into the body, in particular the handle section, of the fluid transfer device. Preferably, a user identification code (user ID) is generated by the authentication. Identifying the user allows to monitor the user activity, in particular the motion data sequences performed by the user. Preferably, the user ID is permanently stored by the control apparatus, in particular in a permanent storage of the motion data sequences, and in particular together with the motion data sequences which were performed by the respective user.

In a preferred embodiment of the invention, the fluid transfer apparatus is configured to implement a character recognition system using the user interface device, wherein at least on motion data sequence, or gesture, to be interpreted as a character, is drawn by a user utilizing the fluid transfer apparatus as a pointing device. The character recognition may be an integrated function of the fluid transfer apparatus, or at least one motion data sequence may be transferred to an external apparatus, also referred to as external data processing apparatus, to which the fluid transfer apparatus may be connected by a wireless or wired data connection. The character recognition system may include the recognition of known numerals and/or characters, according to any alphabet, which is known by the motion data library.

When implementing a character recognition system, the control apparatus may be configured to interpret the at least on motion data sequence of a user as the definition of a value for an operating parameter. For example, the display screen of the user interface device may query the value for an operating parameter, for example show the text "Volume?", and the user may respond to the query by performing a motion of the fluid transfer apparatus, e.g. by drawing a string, in particular the numerals "100", in the air. This string may be interpreted by the control apparatus to mean that the operation parameter "volume" was defined to be 100 μl in the respective context of the control program, in particular during a particular operating mode of the fluid transfer apparatus.

Furthermore, when implementing a character recognition system, the control apparatus may be configured to interpret the at least on motion data sequence of a user as the definition of the operating parameter itself, alternatively or in addition to the value for the respective operating parameter, which is to be entered by the user. For example, the fluid transfer apparatus may be in an operating mode, where a user input is expected to define at least one operating parameter, which is relevant for the respective operating mode, in particular relevant for a set of operating parameters linked to the respective operating mode. For example, the display screen of the user interface device may query an input from the user, for example show the text "Awaiting parameters", and the user may respond to the query by performing a motion of the fluid transfer apparatus, e.g. by drawing the string "V100" in the air. The control apparatus expects a character, which is an alias for the respective operating parameter to be defined, here "V" being the alias for "volume". The string "V100" may be interpreted by the control apparatus to mean that the operation parameter "volume" was defined to be 100 μl in the respective context of the control program, in particular during a particular operating mode of the fluid transfer apparatus.

Furthermore, when implementing a character recognition system, the control apparatus may be configured to interpret the at least on motion data sequence of a user as the definition of a method for automatically performing a pipetting process using the fluid transfer apparatus. The string, which is provided by the user and recognized, may be a script code for programming a method for automatically performing a pipetting process using the fluid transfer apparatus. The script code must be known to the control apparatus and the user. In particular for such a relatively large amount of information, the user interface device based on motion detection is rather efficient, when compared to other conventional input devices.

In case that the at least one motion data sequence is to be interpreted as a string, the control apparatus may be configured to detect the end of the string be represented by an abort of the at least one motion data sequence. Such an abort may be considered when for a predetermined time period, e.g. for 1 second or more, substantially no motion is detected.

Implementing a character recognition system, furthermore, also allows reading larger amounts of information from the user and to store the information in a non-volatile memory of the fluid transfer apparatus, or transfer such information to an external data processing apparatus. For example, the user may be offered to enter larger information containing messages, notices, or a protocol by way of the user interface device, which are then permanently stored. The permanently stored information may also be edited by the user using the fluid transfer apparatus.

The at least one motion data sequence, which was measured, may be interpreted to directly start or stop a pipetting process, in particular to start or stop the aspiration or discharge of a liquid sample from a fluid transfer container, e.g. pipette tip or dispenser tip, mounted at the connection section of the fluid transfer apparatus. For example, when moving a fluid transfer apparatus downwards and stopping this motion directly above or within a target sample container or a target sample well of a wellplate, e.g. by abutting on the bottom or wall of such a sample container, may automatically trigger the discharge of a predetermined amount of sample into the sample container or a sample well.

The fluid transfer apparatus may comprise a data interface device, e.g. a socket for a cable connection or a communication apparatus, for providing a wired or wireless data connection with an external data processing apparatus. Such a data connection may be used to transfer the information, in particular said larger information, into the LIMS (laboratory information management system) or ELN (electronic lab notebook), preferably in the same laboratory, where the fluid transfer apparatus is used.

The user interface device is configured for receiving a user input. The user interface device may provide one or more input devices for allowing a user to input information to the fluid transfer apparatus. An input device may be or comprise a mechanical or capacitive button, a switch, a dial wheel, a selection rocker, a touch-screen, or other conventional input means. Moreover, the user interface may comprise one or more output devices for presenting information to the user. An output device may be or comprise one or more display devices, in particular display screens, based on any suitable technology, e.g. LCD or OLED.

According to the invention, a motion detection system is implemented in the fluid transfer apparatus, the motion detection system comprising, preferably, the motion sensor device and an evaluation algorithm, preferably an evaluation program code. The user interface device comprises at least one motion sensor device for measuring motion data of the handheld fluid transfer apparatus. The measurement of the motion data is fully implemented in the fluid transfer apparatus, which means that the measurement does not involve any external data processing apparatus to participate in the measurement. Parts of the functions and components of the motion detection system may be performed remote of the fluid transfer apparatus. In the preferred embodiment, the motion detection system is fully implemented in the fluid transfer apparatus, which means that no function or component of the motion detection system is mandatory to be performed remote from the fluid transfer apparatus, e.g. using an external data processing apparatus. The motion detection system may comprise functions and components for measuring motion data, in particular including the motion sensor device, and functions and components for evaluating, in particular converting, transforming, comparing and/or recognising, the at least one motion data sequence.

At least one motion data sequence is at least temporarily stored in the motion data memory of the fluid transfer apparatus. It is possible that at least one motion data sequence is, additionally, transferred to an external data processing apparatus, e.g. for the purpose of evaluation. The fluid transfer apparatus may be configured to receive second input data from an external data processing device. Such second input data may be obtained by converting, transforming, comparing and/or recognising, motion data or the at least one motion data sequence by utilizing the external data processing apparatus. The transfer of data between the fluid transfer apparatus and an external data processing apparatus may be performed using a wireless data connection. For that purpose, the fluid transfer apparatus may comprise a communication apparatus, which may be based on any technology for wireless data exchange, e.g. WLAN (Wireless Local Area Network) or Wireless Personal Area Network (WPAN), in particular Wi-Fi, Bluetooth.

The control apparatus preferably contains the evaluation device for evaluating the motion data, the evaluation device utilizing, in particular, electronic circuits, which may be part of the control apparatus. The evaluation device is preferably implemented by an evaluation program code, being configured to provide the input data in dependence on the evaluation of the motion data, in particular by electing parts of, compressing, filtering, or simply shifting or transferring the motion data, or by converting, transforming, compressing, comparing and/or recognising the motion data, the latter being in particular a gesture recognition or character recognition. The evaluation device may also be a dedicated device, in particular containing a data processor or microprocessor in addition to the data processor of the control apparatus. This may unburden the control apparatus from the task of evaluating the motion detection, and the motion detection may become more efficient.

Preferably, the motion sensor device comprises one or more motion sensors capable to detect a motion of the fluid transfer apparatus along at least one straight direction of a coordinate system, preferably along at least two different directions of a coordinate system, or preferably along three different directions of a coordinate system. Preferably, the motion sensor device comprises one or more motion sensors capable to measure an angular rate of the fluid transfer apparatus around at least one straight direction of a coordinate system, preferably around at least two different directions of a coordinate system, or preferably around three different directions of a coordinate system. Said coordinate system is preferably a Cartesian coordinate system and said directions of the coordinate system are preferably the orthogonal directions x, y and z of the Cartesian coordinate system.

Preferably, the motion sensor device comprises one single motion sensor. Preferably, the motion sensor device comprises two motion sensors, which may be configured to measure different motion data. This may include measuring along different directions of motion and/or measuring different physical quantities, e.g. acceleration of the fluid transfer apparatus and angular rate measurement in combination. Moreover, motion sensors may be placed at different positions of the fluid transfer device to provide different or complementary information on the motion. The motion sensor device may comprise different sensors, preferably 2 or 3 sensors, or more sensors for measuring different physical quantities, e.g. related to a translation or rotation of the handheld fluid transfer apparatus with respect to a starting position, or related to measuring the terrestrial magnetic field.

Preferably, the fluid transfer apparatus has a body having an elongated shape, wherein, in particular, a piston is translated along a virtual axis running along the length of a cylindrical airtight sleeve for providing the aspiration and disposal of a fluid sample. A portion of the body of the fluid transfer apparatus serves also as a handle, which is adapted to be held by one hand of the user. The fluid transfer apparatus typically has one end of the body, at which a connection section, e.g. a working cone, is provided for connecting a sample transfer container, e.g. a pipette tip or a dispenser tip. Said end is also referred to as the lower end, while the opposite end is also referred to as the upper end of the fluid transfer apparatus. The handle portion is typically located in the center or in the upper half of the body of the fluid transfer apparatus, measured along the axis.

During operation, the end of the fluid transfer apparatus comprising the connection section has to be aligned by the user in a downward direction rather than in an upward direction, i.e. rather in the direction of gravity than against the direction of gravity, to ensure that a fluid laboratory sample does not flow into the direction of the connection section. Moving the fluid transfer apparatus may comprise translational and/or rotational motion, and providing one motion sensor for measuring a translational motion, e.g. an acceleration sensor, and one motion sensor for providing a rotational motion, e.g. an angular rate sensor, is beneficial to detect the motion with enhanced detail compared to a single motion sensor. Alternatively or additionally, two motion sensors of the same type, e.g. detection of acceleration or angular rate, may be provided to provide redundant or complementary information. This way, an improvement of the motion data is achieved.

Preferably, at least one motion sensor, one single motion sensor or a first motion sensor, or two motion sensors, is/are positioned in the center region, the upper half, preferably in the upper third, preferably in the upper fourth, and most preferably at the upper end of the fluid transfer apparatus, wherein said positions are measured along said axis through the body of the fluid transfer apparatus. Such positioning allows to maximize the signal from a motion sensor, when a user defined point of the lower end of the fluid transfer apparatus, in particular the connection section or a sample transfer container mounted thereto, is—almost or possibly—fixated by the user without moving the point. This may be desirable to minimize the motion of the sample contained in a sample transfer container, which is connected to the connection section, while at the same time maximizing the motion of the motion sensor, in particular the acceleration of the motion sensor. Maximizing the motion of the motion sensor leads to an improved measurement signal and to an improved detection and/or recognition of the motion.

Preferably, at least one motion sensor, one single motion sensor or second motion sensor, or two motion sensors, is/are positioned in the lower half, preferably in the lower third, preferably in the lower fourth, and/or at the lower end of the fluid transfer apparatus. Such second motion sensor may be used alternatively or complementary to the at least one first motion sensor.

Providing the at least one first and the at least one second motion sensor allows to detect a relative motion of the upper and lower half of the fluid transfer apparatus. The signals of the at least one first motion sensor and the at least one second motion sensor may be compared by the evaluation device, in particular a signal addition or subtraction may be provided. This way, the quality of the motion detection can be improved.

When measuring an acceleration or an angular rate, it is possible that a user performs a motion, which pivots the fluid transfer apparatus around a virtual axis, which runs through a point of the fluid transfer apparatus, for example, through the center of the fluid transfer apparatus. Providing two motion sensors at different positions along the body of the fluid transfer apparatus can more precisely detect the motion.

Preferably, the signals of both, the first and second motion sensor, or respectively a plurality of each, are individually evaluated for analysing the same motion of the fluid transfer apparatus. This way, a more complex motion can be detected by providing the at least one first and the at least one second motion sensor. For example, a point in the upper or lower end or the center of the fluid transfer device may be fixated by the user, while the fluid transfer device is rotated around said point. This way, a larger number of motions can be recognized and distinguished from each other.

The motion sensor device may be based on any technology, which is capable to be implemented in the fluid transfer device. Motion data may be obtained, for example, by using a motion sensor device based on the detection of acceleration, vibrational signals, magnetism, radio frequency energy, optical radiaton, or sound. Angular rate measurement may be realized by using one or more electromechanical sensors, vibrating structure gyroscopes, including MEMS gyroscopes, or electrochemical sensors for example.

A motion sensor preferably is a sensor implemented by a microelectromechanical system (MEMS), thereby saving space and costs for the implementation.

Preferably, the motion detection device comprises at least one acceleration sensor. Preferably, an acceleration sensor detects accelerations in the six directions defined by a Cartesian coordinate system, having an x, y and z-axis each having a positive and negative direction. Typically, such an acceleration sensor in a steady state on a horizontal surface will measure 0 g in x-axis and 0 g in y-axis whereas the z-axis will measure 1 g, wherein g=9.8 m/s$^2$. An example for such an acceleration sensor is the LIS331DLH commercially available from STMicroelectronics, Switzerland.

Preferably, the motion detection device comprises at least one gyroscopic sensor. Preferably, a gyroscopic sensor detects angular rates around the six directions defined by a Cartesian coordinate system, having an x, y and z-axis each providing a positive and negative direction of rotation. An example for such a gyroscopic sensor is the L3GD20 commercially available from STMicroelectronics, Switzerland.

Preferably, the motion detection device comprises at least one magnetic field sensor, in particular a geomagnetic sensor for detecting geographical directions (compass function). A magnetic field sensor may be used in combination with an acceleration sensor and/or a gyroscopic sensor to improve the accuracy of motion detection or position detection, respectively. An example for such a geomagnetic sensor is the BMM150, or the combined sensor BMC150, commercially available from Bosch, Germany.

Preferably, the motion detection device comprises at least one combined sensor, which measures at least two of the parameters acceleration (1D, 2D and/or 3D), angular rate (around one, two or three orthogonal axes), position (1D, 2D and/or 3D) or geomagnetic field. A combined motion sensor improves the quality of the motion data and therefore improves the workflow when using the fluid transfer apparatus according to the invention.

The control apparatus has electric circuits, in particular integrated circuits, and/or has a data processor, in particular a microprocessor (CPU) and/or a microcontroller (MCU), data storage and/or program storage. The control apparatus can be configured to process program code. The program code can be configured to implement or execute an evaluation program code for evaluating the at least one motion data sequence, according to the preferred embodiments of the fluid transfer apparatus, which are described within the scope of the invention. The control apparatus preferably has a control program memory for storing the control program.

The control data are understood to be any data which influence or determine at least one electronically controllable function of the fluid transfer apparatus. The concept of generating control data using the input device "user interface device including the motion sensor device" is in analogy to the function of conventional input devices, which are also used to generate control data. The control data may represent, and be interpreted accordingly by the control apparatus, the value of an operating parameter, may represent a user choice or selection of an element shown in a graphical user interface of a display screen, i.e. a user defined marking on the screen, or may represent the confirmation of a choice or selection, i.e. comparable to the conventional function "enter" of a computer keyboard. An electronically controllable function of the fluid transfer apparatus may be a function related to a pipetting process, e.g. controlling the piston for aspirating and/or discharging the sample, or defining a pipetting process, e.g. by setting an operating parameter. An electronically controllable function of the fluid transfer apparatus may also be a function not related to a pipetting process, e.g. a function selected from the group containing {switching between operating modes, switching the pages of a graphical user interface, setting an absolute time and/or date to be stored in the control apparatus, wake up from a standby mode triggered by a motion of the fluid transfer apparatus, user authentication, transferring data between devices within the fluid transfer apparatus or between the fluid transfer apparatus and an external data processing apparatus or laboratory network, in particular LIMS or ELN}.

In particular, the control apparatus is configured to control a pipetting process in accordance with at least one, in particular in accordance with a plurality of, operating parameters, in particular to control it automatically or semi-automatically. A pipetting process is also referred to as fluid transfer process, and includes aspiration and/or disposal of a fluid sample. An automatic control means that, for carrying out the pipetting process, substantially only a start signal is entered by the user by way of a user interface apparatus of the pipetting device and/or that, in particular, the receiving process of at least one fluid sample into at least one transport container connected to the pipetting device can be carried out or is carried out without a user input being required and/or that, in particular, the dispensing process of at least one fluid sample from at least one transport container connected to the pipetting device can be carried out or is carried out without a user input being required. In the case of a semi-automatic control, at least one further user entry is required to carry out the receiving or dispensing process in addition to the entry of a start signal, e.g. an entry with which the user confirms at least one operating parameter to be used after entering the start signal and before carrying out the pipetting process. Both controls—the automatic and semi-automatic control—may be influenced by the at least one motion data sequence, which is performed by a user to input information.

The fluid transfer apparatus can be configured to be operated in one operating mode or in a plurality of operating modes. One operating mode can provide for a set with one or more operating parameters of the fluid transfer apparatus, which influence or control the one pipetting process of the fluid transfer apparatus, to be automatically queried, set and/or applied. The decision as to what the value of an operating value should be is generally respectively made by the user when using the fluid transfer apparatus and the operating parameter is set accordingly. At least one operating parameter of the set of operating parameters, in particular this at least one speed value of a speed parameter, is set by the control apparatus. The definition or selection of control parameters or operating parameters, in particular the choice of an operating mode is preferably performed by querying the user via a graphical user interface displayed on a display screen of the user interface device of the fluid transfer apparatus. It is preferred that the definition or selection of control parameters or operating parameters is performed by the user by performing at least one predefined motion of the fluid transfer apparatus, in particular by implementing a gesture recognition.

In accordance with a pipetting program, a pipetting process of a programmable pipetting device can typically provide for a specific amount of sample to be aspirated in a pipetting container connected to the pipetting device from a start container and, in particular subsequently, to be dispensed again, in particular emitted in a metered manner, to a target container. Depending on the application, the receiving and/or the dispensation of the sample(s) can follow specific orders, in particular sequences, of receiving and dispensing steps, can be carried out in the time-dependent manner and can be matched in time. A pipetting process can preferably be controlled by a set of operating parameters, by means of which the aforementioned processes can be influenced as desired.

Operating parameters for controlling a pipetting process preferably relate to setting the volume to be pipetted in the step of suctioning the sample into a pipetting container connected to the pipetting device or in the step of dispensing the sample from this pipetting container, optionally to the sequence and repetitions of the steps, and optionally to time parameters in the distribution of these processes in time, in particular also to the change of such processes in time, in particular the speed on the basis of the speed value and/or acceleration of the suctioning-in or dispensing of the sample. According to the invention, provision is made for the at least one speed value of a speed parameter to be set by the control apparatus.

The pipetting process is preferably uniquely set by the set of operating parameters. This set of operating parameters is preferably selected and/or entered at least in part, and preferably completely, by the user, in particular by way of the operating apparatus of the pipetting device. A control program for carrying out the desired pipetting process is preferably controlled by way of a set of operating parameters. The control program can respectively be configured in the form of electric circuits of the control apparatus and/or be configured by executable program code, which is suitable for controlling the control apparatus, which is preferably controllable by program code and preferably programmable.

The pipetting device is preferably configured to automatically check the parameter values entered by the user and to compare these with an allowed range of the respective operating parameter. If the parameter value entered by the user lies outside of the admissible range, the entry is preferably either not accepted or set to a default value which, for example, may be the minimum value or the maximum value or the last admissible value entered.

An operating state of the pipetting device denotes, in particular, a ready state of the pipetting device, in which the operating parameters required for carrying out a pipetting process have a value such that the pipetting process can be carried out on the basis of these values.

A fluid transfer apparatus may be designed to be operated in one mode of operation (operating modes) or in a plurality of modes of operation. A mode of operation may provide for a set containing one or more operating parameters for the fluid transfer apparatus which influence or control a pipetting process of the fluid transfer apparatus to be automatically requested, selected and/or applied.

A pipetting process typically provides for a pipetting program to involve a particular quantity of sample being transferred from a starting container into a pipetting container that is connected to the fluid transfer apparatus and then being delivered back into a destination container, particularly being delivered in metered fashion. Depending on the application, the admission and/or delivery of the sample(s) can follow particular ordered patterns, particularly orders, of transfer and delivery steps, can take place on the basis of time and can be attuned in terms of timing. A pipetting process can preferably be controlled by a set of operating parameters which can be used to influence the cited processes in the desired manner. A user may influence or amend at least one operating parameter, which may be part of a set of operating parameters, by way of providing a predetermined motion of the fluid transfer apparatus, which is then measured and evaluated by the fluid transfer apparatus.

Operating parameters for controlling a pipetting process preferably relate to the selection of the volume to be pipetted, in the case of the step of the sample being aspirated into a pipetting container connected to the fluid transfer apparatus or in the case of the step of the sample being delivered from this pipetting container, possibly to the order and repetitions of these steps, and possibly to temporal parameters for the temporal distribution of these processes, particularly also to the alteration of such processes over time, particularly to the speed and/or acceleration of the sample being aspirated or delivered.

The pipetting process is preferably explicitly stipulated by the operating parameter set. This operating parameter set is preferably at least partially and preferably completely selected and/or input by the user, particularly using the user interface device of the fluid transfer apparatus.

However, it is possible for a pipetting process not to be explicitly stipulated by the operating parameter set. It is also possible and preferred for at least one operating parameter not to be stipulated by the user, but rather to be prescribed by the fluid transfer apparatus, for example, by virtue of its being stored therein, for example as previously known parameter(s). The fluid transfer apparatus may be designed to automatically determine at least one operating parameter.

Modes of operation and the operating parameters preferably associated therewith are described below, each preferably being provided for the fluid transfer apparatus:

Preferably, an operating parameter is provided which is used to define a pipetting volume to be pipetted. An operating parameter may be provided which is used to define an aspiration volume to be aspirated during an aspiration step, and/or an operating parameter may be provided which is used to define a delivery volume to be delivered during a delivery step.

Preferably, at least one operating parameter is provided which is used to stipulate the number of directly successive or indirectly successive pipetting volumes, preferably at least one operating parameter which is used to stipulate the number of aspiration steps and/or delivery steps and, in each case, preferably also the respective associated pipetting volumes, the respective associated pipetting speeds and/or accelerations, and/or the respective associated intervals of time between the steps.

Preferably, one mode of operation relates to the "Dispensing" (DIS) of a sample. Associated operating parameters are in each case preferably: the volume of the individual sample, relating to the pipetting volume during one of a plurality of delivery steps; the number of delivery steps; the speed at which the sample(s) is/are admitted; the speed at which the sample(s) is/are delivered. The dispensing function is particularly suitable for quickly filling a microtitre plate with a reagent liquid and can be used for performing an ELISA, for example.

Preferably, one mode of operation relates to the "Automatic dispensing" (ADS) of a sample. Associated operating parameters are in each case preferably: the volume of the individual sample, relating to the pipetting volume during one of a plurality of delivery steps; the number of delivery steps; the duration of the period according to which the delivery steps are automatically performed at constant intervals of time in succession—the period can stipulate these intervals of time or, by way of example, the delay between the end and the beginning of successive delivery steps; the speed at which the sample(s) is/are admitted; the speed at which the sample(s) is/are delivered. This dispensing function is even more conveniently suitable for filling a microtitre plate, since the user does not need to repeatedly initiate a delivery step by means of an operating action, e.g. pressing a key, but rather the delivered takes place under time control after the automatic dispensing is started. Like any other operating program in a mode of operation too, the automatic dispensing can take place under the condition that the relevant program is effected at least when an operating element is operated without interruption, e.g. when a key is held pressed without interruption. This is advantageous in the case of long dispensing operations or reactions, for example, in which precise attention to a time window is required. The automatic dispensing function is even more conveniently suitable for filling a microtitre plate, since the user does not need to initiate a single delivery step himself in this case, but rather this is done automatically, which can be used for performing an ELISA, for example.

Preferably, one mode of operation relates to the "Pipetting" (Pip) of a sample. Associated operating parameters are in each case preferably: the volume of the sample to be pipetted; the speed at which the sample is admitted; the speed at which the sample is delivered.

Preferably, one mode of operation relates to the "Pipetting with subsequent mixing" (P/Mix) of a sample. Associated operating parameters are in each case preferably: the volume of the sample to be aspirated and/or of the sample to be delivered; the mixing volume; the number of mixing cycles; the speed at which the sample is admitted; the speed at which the sample is delivered. The "Pipetting with subsequent mixing" function is recommended for pipetting very small volumes, for example. If a metering volume <10 µL is chosen, it is recommended that this be flushed into the respective reaction liquid. This is possible by virtue of the automatic starting of a mixing movement after the liquid has been delivered. The mixing volume and also the mixing cycles are defined beforehand. One application for this mode of operation is the delivery of a liquid which, on account of its physical properties, is more difficult than water to meter, for example, the residues of which in the pipetting container, particularly the pipette tip, are then rinsed out of the pipetting container, or the pipette tip, using the liquid that has already been presented. A further application would be the immediate mixing of the delivered liquid with the presented liquid. This mode of operation is advantageous when admixing DNA with a PCR mixed solution, for example.

Preferably, one mode of operation relates to the "Multiple admission" of a sample, also referred to as "Reverse dispensing" or as "ASP" for aspirating. Associated operating parameters are in each case preferably: the volume of the sample(s) to be aspirated; the number of samples; the speed of admission; the speed of delivery. The function is used for the multiple admission of a quantity of liquid and a delivery of the entire quantity. In this case, there is no provision for multiple filling of the pipetting container in one process. The speed is the same for all samples. The following preferably takes place during execution: starting from the basic position, the fluid transfer apparatus admits a respective partial volume as a result of a first type of operation of the operator control device. When the last partial volume has been admitted, the fluid transfer apparatus preferably outputs a warning message which preferably needs to be confirmed by the user by virtue of a second type of operation of the operator control device. When the operator control device is next operated in the second manner, the entire volume is delivered again. For operation of the first or second type, the operator control device preferably has at least two control buttons, one for inputting an operator control signal "of first type" into the control device, and one for inputting an operator control signal "of second type" into the control device. The operator control device may have a rocker, in particular, which can be pivoted about an axis perpendicular to the longitudinal axis of the fluid transfer apparatus, in particular, between a first signal initiation position "rocker up" for operation of the first type and a second signal initiation position "rocker down" for operation of the second type.

Preferably, one mode of operation relates to the "Diluting" (Dil) of a sample, also referred to as "dilution". Associated operating parameters are in each case preferably: the sample volume; the air bubble volume; the diluent volume; the speed of admission; the speed of delivery. The maximum diluent volume=nominal volume−(sample+air bubble). This function is used for the admission of a sample and of a diluent with separation by an air bubble and delivery of the entire quantity. The speed is the same for all partial volumes. The following preferably takes place during execution: starting from the basic position, the fluid transfer apparatus first of all admits the diluent volume, then the air bubble and finally the sample. Each admission is initiated preferably separately by means of operation of the operator control device of a first type. The entire quantity is then delivered in one.

Preferably, one mode of operation relates to the "Sequential dispensing" (SeqD) of samples. Associated operating parameters are in each case preferably: number of samples (preferably up to a firmly prescribed maximum number Nmax of preferably 5<=Nmax<=15, preferably Nmax=10); individual volumes of the individual samples; speed of admission; speed of delivery. This function is used for sequentially dispensing Nmax user-selectable volumes, in this case multiple filling of the pipetting containers is preferably not envisaged. The speed is the same for all samples. The number of samples is preferably the leading parameter for the input of the individual volumes. When the volumes are input, the pipette preferably always needs to check whether the maximum volume of the fluid transfer apparatuses is not exceeded; if appropriate, a warning message is output. When all the parameters have been input, the fluid transfer apparatus admits the entire volume when the operator control device has been operated in the first manner and delivers a respective individual volume when the operator control device has been operated in the second manner. All further cycles preferably behave in a manner of normal dispensing.

Preferably, one mode of operation relates to the "Sequential pipetting" (SeqP) of samples. Associated operating parameters are in each case preferably: number of samples (preferably up to a firmly prescribed maximum number Nmax of preferably 5<=Nmax<=15, preferably Nmax=10); individual volumes of the individual samples; speed of admission; speed of delivery. This function is used for pipetting a maximum of Nmax user-selectable volumes which are programmed before the start and have a fixed sequence. The speed is preferably the same for all samples in order to allow simple operator control of this mode of operation. Alternatively, the speed may be selectable in different ways. The cycle of the function corresponds to the cycle of pipetting. The previously input volumes are processed in the programmed order. Following delivery, operation of an operator control element, e.g. pressing a key, is used to decide whether the next sample is meant to be admitted or, before the next sample, a "blowout", that is to say complete, safe blowing-out of the sample which the pipetting container still contains first needs to be carried out by means of excess movement, and/or whether the pipetting container needs to be changed.

Preferably, one mode of operation relates to the "Reverse pipetting" (rPip) of samples. Associated operating parameters are in each case preferably: the volume of the individual sample; the speed of admission; the speed of delivery; activation of the counter. In the case of this "rPip" function, more than the volume to be metered is admitted. This is achieved by moving the piston downwards prior to the admission of liquid, namely by means of operation of the second type, i.e. by means of a key being pressed or "rocker downwards", for example, until it reaches the lower position for a blowout, that is to say for excess movement by the piston, which goes beyond the position of the piston during pipetting movement. At the start of the admission of volume, the fluid transfer apparatus admits the volume for the blowout and the selected volume. In order to remove the play in the propulsion in the delivery direction, the fluid transfer apparatus executes an additional movement which is immediately delivered again. This is similar to dispensing, but preferably takes place with automatic delivery of the rejection movement at maximum speed.

During execution of the "rPip" mode of operation, the following preferably takes place: first, the operator control device is operated in the second manner: the piston of the fluid transfer apparatus travels to blowout and remains stationary in the lower position. Secondly, the operator control device is operated in the first manner: the piston travels through the blowout section and through the movement for the pipetting volume upwards. Thirdly, the operator control device is operated in the second manner: the piston travels by the movement for the pipetting volume downwards and remains stationary before the blowout. Fourthly, the operator control device is operated in the second manner again: the piston performs the blowout and remains stationary in the lower position. As an alternative to "fourthly", the operator control device is operated in the first manner: the piston travels through the pipetting movement upwards. The "rPip" mode is particularly suitable for pipetting plasma, serums and other liquids having a high protein content. For aqueous solutions, the "Pipetting" mode is particularly suitable. The "rPip" mode is particularly suitable for solutions containing wetting agent in order to minimize the formation of foam upon delivery to the destination vessel. The liquid is admitted particularly with excess movement (blowout volume). In this case, the excess movement is typically not part of the delivery volume and is preferably not delivered to the destination vessel. Particularly when the same sample is used again, the excess movement can remain in the tip. When another liquid is used, the excess movement and/or preferably the pipetting container is/are preferably rejected.

An operating parameter set preferably controls a control program to perform the desired pipetting process. The control program may respectively be produced in the form of electric circuits of the control device, and/or may be produced by an executable program code which is suitable for controlling a control device which can be controlled by program code and is preferably programmable.

Preferably, the fluid transfer apparatus, in particular the user interface device, has a display device which can be used to display information to the user. The display device is preferably a display screen, preferably a colour display. The display screen may have an input functionality, in particular it may be a touch screen. The control apparatus may be configured to display, preferably in dependence on the present operating mode, a specific page of a collection of one or more pages, which respectively present a graphical user interface to the user. The graphical user interface is used to provide information to the user and to query input from the user. The input may be selected from a collection of possible items shown in the graphical user interface, for example a list of possible values for an operating parameter. Using the user interface device of the fluid transfer apparatus according to the invention it is also possible to let the user enter a gesture in the shape of one or more numerals or characters for defining the value of an operating parameter.

Preferably, the operator control device has at least one operator control element having a variable function, which is also referred to as a softkey. An operator control element, particularly the softkey, may be particularly a programmable operator control element, the function of which can be programmed particularly by the user. Preferably, the softkey has an operating-mode-specific function which is dependent on the selected mode of operation of the fluid transfer apparatus.

Preferably, the fluid transfer apparatus has a display device and a plurality of at least partially predefined display pages which are stored in the fluid transfer apparatus and which can be displayed in the display device preferably so as to fill the screen, wherein the operator control element having a variable function has, on the basis of the displayed display page, a respectively predetermined function which is denoted and displayed on the display page preferably at a predetermined position.

Preferably, the fluid transfer apparatus has a display device and a time recording device. The time recording device may have a quartz oscillator. Preferably, the memory device is in the form of a FIFO memory (First In, First Out), which means that the data entered first are also rejected again first, particularly overwritten. The time recording device may be part of the control device, in particular.

Preferably, the fluid transfer apparatus has a counter device which can be used to count a number of recurring processes, e.g. the repeated delivery of a sample, the recurring aspiration of a sample or the recurring use of a mode of operation. The counter device is also referred to as a counter.

Preferably, the fluid transfer apparatus and/or the control apparatus is configured in such a way that any data, in particular control data, can be interchanged between the fluid transfer apparatus and an external data-processing apparatus, e.g. a PC, and/or between the control apparatus and an external data-processing apparatus, e.g. a PC, i.e., in particular, be transferred from the fluid transfer apparatus to the external data-processing apparatus and/or be transferred from the external data-processing apparatus to the fluid transfer apparatus. In particular, the pipetting device can be configured to enable such a data interchange in a wired or wireless manner.

The fluid transfer apparatus according to the invention can be a single-channel pipette or a multichannel pipette. Furthermore, in particular, it can be a pipette or a repeater pipette (dispenser). Preferably, the fluid transfer apparatus is a wireless operated device, which contains a battery or an accumulator for powering the fluid transfer apparatus. The fluid transfer apparatus is a portable device, which can be easily transported and/or operated by one hand of a user.

Motion data may comprise a plurality of data points, in particular numbers, representing measured data, in particular acceleration or rate data. A motion data sequence may contain at least the data points, preferably together with other information, for example, time information. The motion data may be, for example, values of acceleration or values of a rate measured by a motion sensor. Such values may be recorded in dependence on the time, e.g. including a time stamp for each motion data or including information on the variation in time with respect of measuring the data points. For example, the measurement may, at least for a certain motion data sequence(s), take place equidistant in time, and the constant time period for the related motion data sequence(s) may be combined with the data points to form the motion data.

The motion data may also be position data, in case that the motion sensor device is capable to provide position data. The at least one motion data sequence may then represent a trajectory of the motion path of the motion sensor, or the fluid transfer apparatus, respectively. Acceleration or speed/rate values may be used to determine position data by integration with respect to the elapsed time. Moreover, information form multiple motion sensors may be used to provide position data.

The invention also relates to a laboratory system for controlling at least one handheld fluid transfer apparatus, the at least one handheld fluid transfer apparatus being configured for performing a fluid transfer process on a fluid laboratory sample and being more particularly a pipette or repeater pipette, the at least one handheld fluid transfer apparatus comprising a control apparatus, which comprises a data processor capable to execute a control program for controlling at least one electronically controllable function of the handheld fluid transfer apparatus using input data, the at least one handheld fluid transfer apparatus comprising a user interface device for receiving user input, the user interface device comprising a motion sensor device for measuring motion data of the handheld fluid transfer apparatus and for providing at least one motion data sequence, which contains subsequently measured motion data, the at least one handheld fluid transfer apparatus comprising a communication device for sending the at least one motion data sequence to at least one external data processing apparatus, and for receiving the input data from the at least one external data processing apparatus.

Moreover, the laboratory system comprises the at least one external data processing apparatus, the at least one external data processing apparatus comprising a motion data memory for storing the at least one motion data sequence, the at least one external data processing apparatus comprising an evaluation device being configured to determine the input data in dependence on the evaluation of the at least one motion data sequence, and the at least one external data processing apparatus comprising a communication device for receiving the at least one motion data sequence from the at least one handheld fluid transfer apparatus, and for sending the input data to the at least one handheld fluid transfer apparatus.

The evaluation device preferably comprises a data processor, which processes the motion data, in particular the at least one motion data sequence, and determines the input data in dependence on the motion data, in particular the at least one motion data sequence. Preferably, the at least one external data processing apparatus, in particular the evaluation device, is configured to provide a motion gesture recognition system, where the at least one motion data sequence is interpreted by the evaluation device to be a gesture.

The at least one external data processing apparatus may also comprise the motion data library memory.

The laboratory system according to the invention offers the advantage that the steps of processing of the motion data, in particular the at least one motion data sequence, are at least in part, or mostly or completely not performed by the handheld fluid transfer apparatus, and/or are preferably at least in part, or mostly or completely performed by the at least one external data processing apparatus. Thereby, the hardware needs, the energy consumption and the heat dissipation related to the steps of processing are outsourced from the handheld fluid transfer apparatus. In consequence, the handheld fluid transfer apparatus can be configured light-weight, and the physical influence, e.g. heat, of the data processing on the fluid samples to be treated can be minimized. Moreover, the hardware for data processing can be chosen more powerful, since the energy supply of an external data processing apparatus is not mandatory a battery, but preferably a wired power supply.

Preferred embodiments of the laboratory system according to the invention may be derived from the description of preferred embodiments and features of the handheld fluid transfer apparatus according to the invention, and vice versa.

Regarding, in particular a preferred embodiment of the laboratory system, the communication device, e.g. a network adapter, of the handheld fluid transfer apparatus and the communication device of the external data processing apparatus, respectively, may be configured to exchange data, in particular the at least one motion data sequence and/or the input data, by a wireless data connection implemented by the communication devices. The wireless data connection may implement a wireless network, in particular a wireless local area network (WLAN). The wireless network may implement an Ethernet network, in particular according to IEEE 802.11 WLAN standards.

The laboratory system may comprise a local computer network including at least one external data processing apparatus and/or the at least one handheld fluid transfer apparatus, the local computer network preferably being implemented as an Ethernet network. The local computer network, in particular the apparatuses and possibly other local computers connected in the computer network, is preferably located on premise of the company or person, using the laboratory system. The local computer network may be set up locally behind a corporate firewall using local hard- and software. The local computer network may be a local area network (LAN), i.e. a computer network that interconnects computers within a limited area such as a residence, school, laboratory, or office building. Preferably, Ethernet, in particular over cabling and/or Wi-Fi is used for implementing the local area network.

Preferably, one, or a number N1>1, of external data processing apparatuses may be part of to laboratory system, for generating the input data for a number N2 of handheld fluid transfer apparatuses, wherein preferably N2>N1. This way, only one, or a small number N1, of external data processing apparatuses is required to realize an efficient laboratory system. It is also possible and preferred that N1=N2=1, thereby reducing data traffic required between the apparatuses.

Furthermore preferred, at least one external data processing apparatus of the laboratory system may be located remote from the local computer network, and may be connected to the same via another data network, e.g. a global network, preferably the Internet. The laboratory system may be configured to receive the input data from remote of the handheld fluid transfer apparatus, e.g. via the other data network, e.g. the global network, preferably the Internet. This way, a particular efficient laboratory system may be implemented, wherein a remote instance, i.e. the at least one remote external data processing apparatus offers data evaluation for the handheld fluid transfer apparatuses located in a number of local instances, e.g. laboratories.

A method according to the invention is provided for operating an electric fluid transfer apparatus, particularly the fluid transfer apparatus according to the invention, to operate a fluid transfer apparatus, preferably has the following steps:
  receiving user input by measuring motion data of the motion of the handheld fluid transfer apparatus, when the same is moved by a user, and providing at least one motion data sequence, which contains subsequently measured motion data,
  storing the at least one motion data sequence in a motion data memory,
  determine the input data in dependence on the evaluation of the at least one motion data sequence, and
  controlling at least one electronically controllable function of the handheld fluid transfer apparatus using the input data.

A program code according to the invention is provided for implementing the method according to the invention in a fluid transfer apparatus, the program code being usable by a fluid transfer apparatus in such a way that the latter is a fluid transfer apparatus having the features according to the invention and that the program code, when executed, realizes the method according to the invention.

Further preferred embodiments of the method according to the invention can be found in the description of the fluid transfer apparatus and the laboratory system, and the preferred embodiments thereof.

Further preferred embodiments of the fluid transfer apparatus and the laboratory system according to the invention and of the method according to the invention can also be found in the description of the exemplary embodiments below in conjunction with the figures and the description thereof. Identical components of the exemplary embodiments are essentially denoted by the same reference symbols unless a different description is given for this or the context reveals otherwise. In the figures:

FIG. 1c shows a perspective view of a motion sensor for detecting a 3D-motion, which is usable for the embodiment in FIG. 1a.

FIG. 2a shows a side view of an exemplary embodiment of the handheld fluid transfer apparatus according to the invention.

FIG. 2b shows a front view of the handheld fluid transfer apparatus of FIG. 2a.

FIG. 3 shows a schematic view of the handheld fluid transfer apparatus of FIG. 2a, 2b.

Figure 5A:
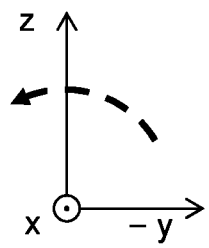
Figure 5B:
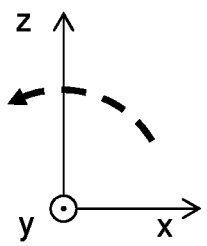
Figure 5C:
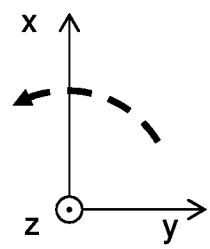

FIG. 5a to FIG. 5c, respectively, show a rotation motion around the x, y- and z-axis of a Cartesian coordinate system, which may be utilized as a predetermined gesture to be recognized by a preferred embodiment of the fluid transfer apparatus according to the invention.

Figure 5D:
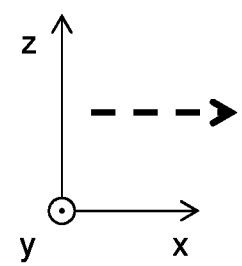
Figure 5E:
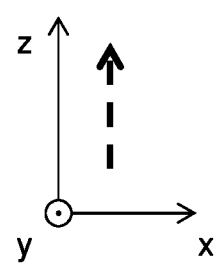
Figure 5F:
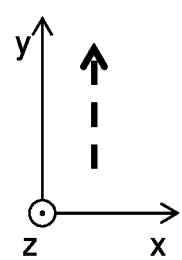

FIG. 5d to FIG. 5f, respectively, show a translational motion along the x, y- and z-axis of a Cartesian coordinate system, which may be utilized as a predetermined gesture to be recognized by a preferred embodiment of the fluid transfer apparatus according to the invention.

Figure 5G:
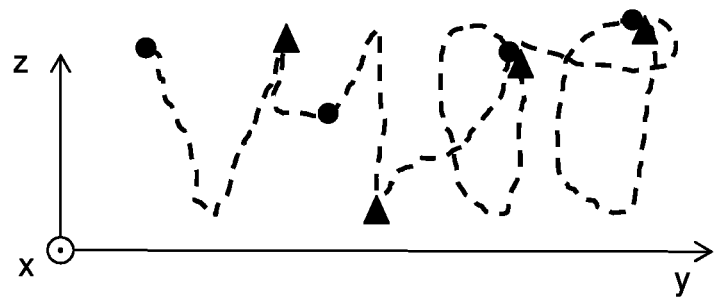

FIG. 5g shows a longer motion in the y-z-plane of a Cartesian coordinate system, which may be utilized as a gesture to be recognized by a character recognition system implemented by a preferred embodiment of the fluid transfer apparatus according to the invention.

Figure 6:
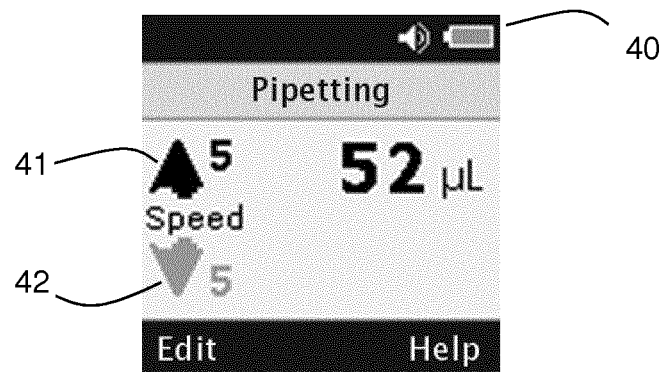

FIG. 6 shows a page of a graphical user interface, which may be displayed by a display screen of a preferred embodiment of the fluid transfer apparatus according to the invention for the purpose of querying information from the user, which may respond with a motion of the fluid transfer apparatus to input the requested information to the same.

Figure 7:
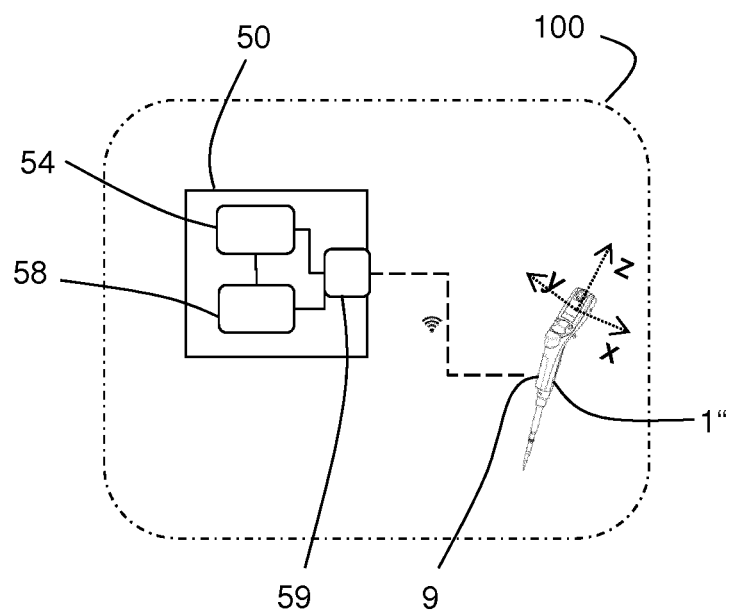

FIG. 7 shows a laboratory system according to a preferred embodiment of the invention including a preferred embodiment of the fluid transfer apparatus according to the invention.

Figure 8:
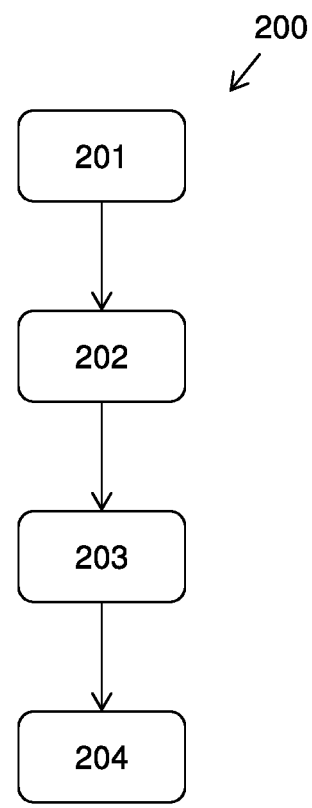

FIG. 8 shows an embodiment of the method according to the invention for operating a handheld fluid transfer device, in particular the handheld fluid transfer device according to the invention.

In the embodiment of FIGS. 2a and 2b, the handheld fluid transfer apparatus is a laboratory pipette, hereinafter pipette 1, 1'. As shown in FIG. 2a, the pipette is configured to be held by one hand of a user at a handle section 10a of the body 10 of the pipette. The handle 10a extends from around the center line C, indicating the geometric central point of the pipette along the A-axis, into the upper half of the pipette. The body 10 of the pipette has an elongated shape extending along an axis A and has a length L measured along the axis A. The line C marks the center of the pipette along the axis A. The axis A is also the symmetry-axis of a piston, not shown, located inside the pipette, which is driven by an electrical drive (not shown) to aspirate and/or discharge a liquid sample, which is contained in the sample transfer container, here a pipette tip 30. Forming an airtight connection in the conventional manner, the tip 30 is plugged on a working cone 11 of the pipette 1, located at the lower end of the pipette 1 and forming the lowest end of the pipette. The pipette has an ejector sleeve 16 for releasing and dropping the tip 30 from the working cone by a downward motion of the sleeve 16, which is driven by button 15 to be pushed by the user. The pipette 1, 1' is shown here aligned along the direction g of gravity.

As shown in FIG. 3, the pipette 1, 1' has a control apparatus 2, which may comprise a microprocessor including a data processor 3. The control apparatus 2 is configured for controlling at least one electronically controllable function of the handheld fluid transfer apparatus. The control apparatus 2 includes program memory for storing a computer program, which controls the pipette 1, 1', and which in particular contains the control program for controlling at least one electronically controllable function of the handheld fluid transfer apparatus. The electronically controllable functions include controlling parameters, e.g. speed, acceleration, time course, for controlling the electrical drive for moving the piston. Such electronically controllable functions include further displaying one page 40 or more pages of a graphical user interface, as shown for example in FIG. 6, in a display screen 12 of the user interface device 5. During operation of the pipette, the control apparatus, in particular the data processor 3, executes a control program for controlling multiple electronically controllable functions of the handheld fluid transfer apparatus using input data.

The input data are used by the pipette 1, 1' to control the electronically controllable functions such that some electronically controllable functions are dependent on one or more operating parameters, which are defined by the input data, thereby acting as control data for controlling the electronically controllable functions. Moreover, some of the electronically controllable functions of the pipette 1, 1' are configured to use the input data, and are configures to shift the input data to a non-volatile memory and/or to send the input data to an external apparatus via the communication apparatus 9. For example, the pipette is configured to implement a character recognition system for identifying the motion of the pipette, performed by a user, to describe one or more characters. The character or string, identified this way, can represent the input data and can be stored or send, in certain operating modes of the pipette 1.

The pipette 1, 1' comprises the user interface device 5 for receiving user input data. The user interface device 5 comprises conventional input devices like buttons 13, 14, a dial wheel and a selection rocker for receiving input from the user, in predefined input operating modes of the pipette 1, 1'. The user interface device 5 comprises the display screen 12 for displaying one page 40 or more pages of a graphical user interface, as shown for example in FIG. 6, in the display screen 12. Such pages contain information and/or query masks for requesting user input from the user.

The pipette 1, 1', in particular the user interface device 5, comprises a motion sensor device 6 for measuring motion data of the pipette 1, 1' and for providing at least one motion data sequence, which contains subsequently measured motion data. Such a motion data sequence including motion data, or motion data points, respectively, is exemplarily shown in FIG. 4b.

The pipette has a motion data memory 8, here a volatile memory, for storing the at least one motion data sequence.

The pipette 1, 1' has an evaluation device 4 being configured to determine the input data in dependence on the evaluation of the at least one motion data sequence. Depending, in particular, on the input operating mode applied to the pipette 1, 1' either by the control program and/or selected by the user, the input data are interpreted by the control apparatus in a predetermined way. In one operating mode(s), the input data may form control data for controlling one or more electronically controllable functions. In another operating mode(s), the input data may not form control data but be stored or transferred to any other apparatus or memory.

The motion sensor device 6 comprises two sensors, in the embodiment for pipette 1, 1'. One sensor 7 may be an acceleration sensor, as shown in FIG. 1c, which measures 3D-acceleration, see the representation of the sensor LIS331 DLH commercially available from STMicroelectronics, USA, shown in FIG. 1c. One sensor 7' may be a gyroscopic sensor, which measures the angular rate $\Omega_x$, $\Omega_y$, $\Omega_z$ around three orthogonal rotation axes, with reference to a coordinate system fixed with respect to a point in/at the motion sensor, see the representation of the sensor L3GD20 commercially available from STMicroelectronics, USA, shown in FIG. 1d.

One or both sensors 7, 7' may be a combined sensor, which measures 3D-acceleration and also gyroscopically measures the rotation around three orthogonal rotation axes, with reference to a coordinate system fixed with respect to a point in/at the motion sensor. It is also possible that one sensor 7, 7' includes a geomagnetic field sensor, i.e. a compass sensor, for improving the physical measurement of the motion data. One of the sensors is positioned in the upper half and at the upper end in the body of the pipette 1, 1'. One of the sensors is positioned in the lower half and at the lower end in the body of the pipette 1, 1'. Using such a spatial distribution of the motion sensors, the motion of the fluid transfer apparatus can be measured more precisely, which is particularly beneficial for detecting more complex motions, e.g. for character recognition, or for improving the quality of the motion data. The motion data may comprise time stamps indicating the time of measurement of a motion data point, or at least indicate at least the relative or absolute start time and/or end time, as long as the time periods between the motion data points are known, e.g. in case that the temporal distance between subsequent motion data points is constant or otherwise known. The motion data of the two different motion sensors 7, 7' may be evaluated in combination with respect to the point in time at which pairs of motion data points of the two different motion sensors 7, 7' were measured. Or, the motion data of the two different motion sensors 7, 7' may be evaluated independently.

The evaluation device 4 is implemented by electric circuits of the control apparatus and by an evaluation algorithm, or evaluation program code, respectively, executed by the control apparatus. The evaluation device 4 uses the at least one motion data sequence, stored in the motion data memory 8, and determines the input data, depending on the respective input operating mode of the pipette 1, 1'. A motion gesture recognition system may be implemented to determine that the input data refer to specific control data, correlated to the at least one motion data sequence in the motion data memory 8. A character recognition system may be implemented to determine that the input data refer to a specific user defined string, which is to be used to derive control data therefrom either, or may be used to be stored in a non-volatile memory.

Figure 1A:
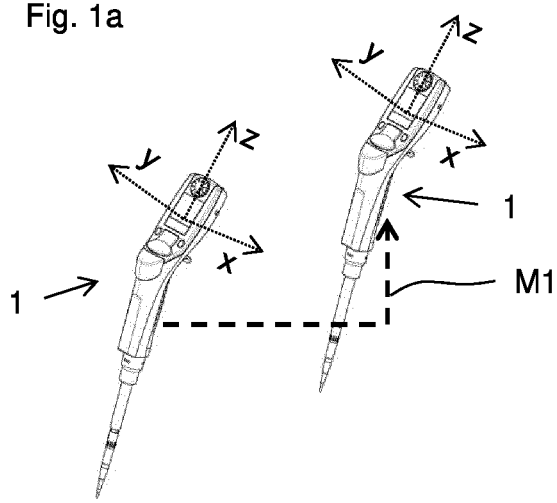
FIG. 1a shows a perspective view of an exemplary embodiment of the handheld fluid transfer apparatus according to the invention being configured to detect a translational or curved motion in 3D, which is used to determine input data.
Figure 1B:
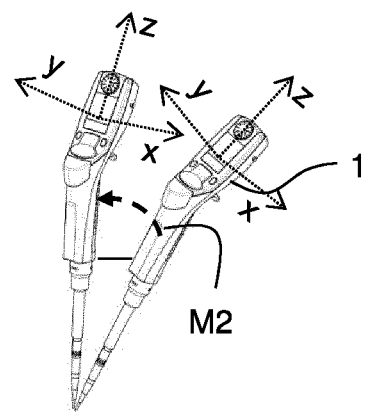
FIG. 1b shows a perspective view of the handheld fluid transfer apparatus of FIG. 1a, being configured to detect a rotational motion by detecting rotation around three orthogonal axes, the rotational motion being used to determine input data.
Figure 1C:
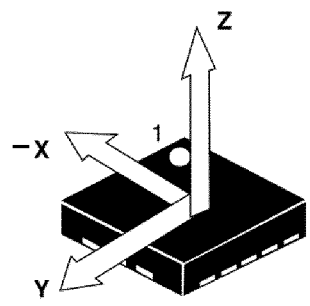
Figure 1D:
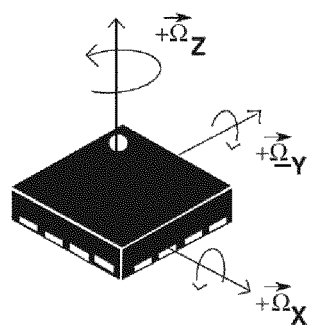
FIG. 1d shows a perspective view of a motion sensor for detecting a rotational motion with respect to three orthogonal axes of rotation, which is usable for the embodiment in FIG. 1b.

FIG. 1a, 1b shows the handheld fluid transfer apparatus 1, being a laboratory pipette, configured to detect a motion M1 or M2 which is used to determine input data. The motion M1 is shown to be a motion pattern including a first sub-pattern, being a translational motion along a first straight axis, followed by a kink and a second sub-pattern, being a translational motion along a second straight axis perpendicular to the first axis. The motion M1, M2 may be interpreted as gestures of a motion gesture recognition system, the user interface device thereby acting as a gesture controlled input system.

The Cartesian coordinate system x-y-z, shown in FIGS. 1a and 1b, corresponds to the Cartesian coordinate system x-y-z shown more clearly in FIG. 2a, 2b. In particular, the axis z is parallel to the axis A, which is the direction of the movement of the piston, which controls the aspiration/release volume of the pipette 1.

Figure 4A:
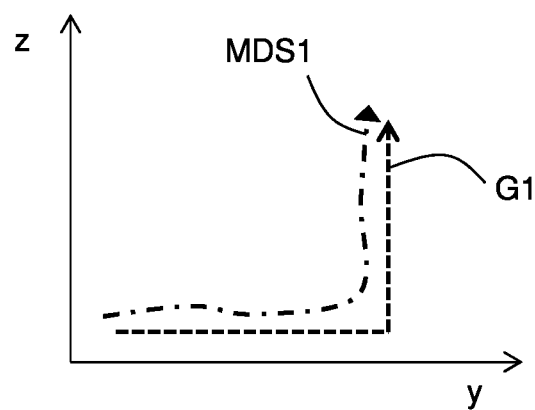
FIG. 4a shows a diagram along the y-z-plane of a Cartesian coordinate system, where the course of a motion data sequence MDS1 is schematically shown, which is the position curve of a motion sensor inside a fluid transfer apparatus according to the invention, which is applied by a user to imitate a predetermined gesture G1.
Figure 4B:
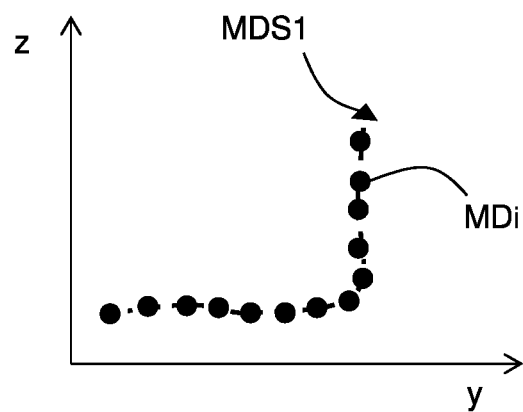
FIG. 4b shows the motion data sequence MDS1 of FIG. 4a, which is set up as a sequence of motion data, which are shown as points of the curve.

The motion recognition system, which is implemented by the user interface device 5 and the evaluation device 4, provides to, first, capture a motion data sequence, for example the motion data sequence MDS1, shown in FIG. 4a. For this purpose, the user has to "draw" the motion MDS1 into the air, using the pipette 1, 1' as a pointer device. Before the user starts drawing a motion, in general, the control apparatus has to know, that the motion input mode is activated, which means that a user is ready to start performing the motion, e.g. drawing MDS1. For this purpose, the control apparatus may comprise a signal device, in particular a blinking graphical marker displayed in the screen 12 and/or sound, which indicates the start and/or end of motion detection to the user. This way it is avoided that any other movement of the handheld fluid transfer apparatus, which is not intended by the user to represent a gesture for input, is erroneously interpreted as input data, followed by erroneously performing the electronically controllable function of the handheld fluid transfer apparatus being possibly correlated with the erroneously detected gesture.

Here, the pipette 1, 1' provides, additionally, a button 14, which acts as an activity input device. The start and the end of the motion input mode is triggered by the user by way of the spring supported button 14. Triggering the activity input device starts the motion input mode, releasing the button 14 ends the motion input mode. A longer period, e.g. larger than 2 seconds, will be interpreted—depending on the context of the control program, e.g. the specific operating mode, which requires input—by the control apparatus such that the input of the user is finished. For example the user may start the motion input mode by actuating the activity input device, and the user may end the motion input mode by releasing the activity input device. The control apparatus, in particular the control program, is configured to control the activity/inactivity of the motion input mode by detecting the status of the activity input device.

In case that a gesture recognition is executed on the at least one motion data sequence stored in the motion data memory 8, the evaluation device accesses a motion data library, which is a database stored in a motion data library memory, and performs a comparison operation to determine, whether the curve MDS1 matches with a predefined gesture G1, shown in FIG. 4a. In case that a match is determined, the evaluation device determines the specific input data, which are correlated with the detected gesture G1 at least under the specific context of the control program. Such a correlation may be taken from a table of correlated gestures, input data, and context, which may be stored in the motion data library memory or another memory.

When querying the user by a specific query page of the graphical user interface, the gesture G1 will result in the same action, e.g. choice of an operating parameter. For example, a tilt motion of the pipette 1, 1' around the x-axis, as shown in FIG. 5a (in the user's practise a rotation towards the user), performed when the query page 40 is presented (see FIG. 6), will always highlight the lower dart 41 shown in the page 40 and decrease the operating parameter "speed value" by a predetermined increment (action 1), a tilt motion of the pipette 1, 1' around the x-axis in opposite direction compared to FIG. 5a (in the user's practise a rotation away from the user), performed when the query page 40 is presented (see FIG. 6), will always highlight the upper dart 41 shown in the page 40 and increase the operating parameter "speed value" by a predetermined increment (action 1). Alternatively, a tilt motion of the pipette 1, 1' around the y-axis, as shown in FIG. 5b, performed when the query page 40 is presented, will always highlight the lower dart 42 (which is shown here by a non-highlighted colour in the page 40) and decrease the operating parameter "speed value" by a predetermined increment (action 2). Ending the input (action 3) of the operating parameter "speed value" may be indicated by the user by a translational motion, which can be detected by the accelerometer values, when said translational motion is started and ended.

The "dependence on the context" means that, in particular, the same gesture, e.g. the gesture in FIG. 5a, is correlated to the same action in the same query page 40, but is correlated to another action, for example, in the context of another query page. For example, the gesture in FIG. 5a may, in another context, when another query page is displayed, be interpreted as an increase of the operating parameter "volume".

FIG. 5g shows a longer motion, coding a larger amount of information, by drawing in the y-z-plane of a Cartesian coordinate system, which may be utilized as a gesture to be recognized as a string by a character recognition system implemented by the pipette 1, 1'. Here, the user is queried to input a string. The user draws "V100" in the air. Each user action of triggering of the button 14, drawn here as a circular point, starts a measurement of a motion data sequence, indicating the start of a single character. Each user action of releasing the pressed button 14, drawn here as a triangular point, ends a measurement of the motion data sequence, indicating the end of a single character. After a period of larger than, e.g. 2 seconds, the control apparatus concludes that the user input was finished in this context. Alternatively, or by way of a confirmation dialog screen shown in the display screen, the handheld fluid transfer apparatus may be configured to request a confirmation action from the user to confirm the finishing of the input mode. Said confirmation action may be the actuation of a conventional input device by the user, e.g. pressing a button. The evaluation device recognizes the multiple motion data sequences as a string, wherein the leading letter "V" is interpreted by the control apparatus to refer to the selection of the operating parameter "volume" and the subsequent number "100" is interpreted as the value "100" of the volume, entered by the user in microliter (or any other suitable unit).

The character recognition system may also be configured to work without using the activity input device 14 for marking the start and end of individual characters, by choosing a suitable algorithm for the character/string or script recognition.

FIG. 7 shows the laboratory system 100 for controlling at least one handheld fluid transfer apparatus 1". For a user, the handheld fluid transfer apparatus 1" will appear to deliver the same functionality as the fluid transfer apparatus 1', because the motion data memory and the evaluation device are also provided, but are located on an external apparatus 50, which receives the at least one motion data sequence from the handheld fluid transfer apparatus 1" via a data connection—here WIFI—established between the communication devices, here network adapters 9, 59, calculates the input data by comparing the at least one motion data sequence with the entries of a motion data library and sends the input data to the handheld fluid transfer apparatus 1", where the control apparatus of the handheld fluid transfer apparatus 1" executes a control program for controlling at least one electronically controllable function of the handheld fluid transfer apparatus using the input data.

The laboratory system 100 comprises the at least one handheld fluid transfer apparatus being configured for performing a fluid transfer process on a fluid laboratory sample and being more particularly a pipette or repeater pipette, the at least one handheld fluid transfer apparatus comprising a control apparatus 2, which comprises a data processor 3 capable to execute a control program for controlling at least one electronically controllable function of the handheld fluid transfer apparatus using input data, the at least one handheld fluid transfer apparatus comprising a user interface device 5 for receiving user input, the user interface device comprising a motion sensor device 6 for measuring motion data of the handheld fluid transfer apparatus and for providing at least one motion data sequence, which contains subsequently measured motion data, the at least one handheld fluid transfer apparatus comprising a communication device 9 for sending the at least one motion data sequence to at least one external data processing apparatus, and for receiving the input data from the at least one external data processing apparatus.

Moreover, the laboratory system 100 comprises the at least one external data processing apparatus 50, the at least one external data processing apparatus comprising a motion data memory 58 for storing the at least one motion data sequence, the at least one external data processing apparatus comprising an evaluation device 54 being configured to determine the input data in dependence on the evaluation of the at least one motion data sequence, and the at least one external data processing apparatus comprising a communication device 59 for receiving the at least one motion data sequence from the at least one handheld fluid transfer apparatus, and for sending the input data to the at least one handheld fluid transfer apparatus.

In FIG. 8, the method 200 for operating a handheld fluid transfer device, in particular the pipette 1; 1', comprises the steps:

receiving user input by measuring motion data of the motion of the handheld fluid transfer apparatus, when the same is moved by a user, and providing at least one motion data sequence, which contains subsequently measured motion data, (201)

storing the at least one motion data sequence in a motion data memory, (202)

determine the input data in dependence on the evaluation of the at least one motion data sequence, (203) and controlling at least one electronically controllable function of the handheld fluid transfer apparatus using the input data. (204)

The invention claimed is:

1. A handheld fluid transfer apparatus (1; 1'), more particularly pipette or repeater pipette, for performing a fluid transfer process on a fluid laboratory sample, comprising a control apparatus (2), which comprises a data processor (3) capable to execute a control program for controlling at least one electronically controllable function of the handheld fluid transfer apparatus using input data, a user interface device (5) for receiving a user input, the user interface device comprising a motion sensor device (6) for measuring motion data of the handheld fluid transfer apparatus and for providing at least one motion data sequence, which contains subsequently measured motion data, a motion data memory (8) for storing the at least one motion data sequence, and an evaluation device (4) being configured to determine the input data in dependence on the evaluation of the at least one motion data sequence, wherein the user interface device (5) is configured to provide a motion input mode, which, when active, allows that a user input via the motion sensor device (6) of the user interface device (5) of the fluid transfer apparatus is measured, while a user input via the motion sensor device (6) is not measured, when the motion input mode is inactive, and wherein the user interface device (5) comprises an activity input device (14) for letting the user influence the activity or inactivity of a motion input mode of the fluid transfer apparatus.

2. The handheld fluid transfer apparatus according to claim 1, wherein the control apparatus (2) is configured to utilize the input data as control data for controlling a plurality of electrically controllable functions of the handheld fluid transfer apparatus.

3. The handheld fluid transfer apparatus according to claim 1, wherein the fluid transfer apparatus is configured to provide a motion gesture recognition system, where the at least one motion data sequence is interpreted by the evaluation device (4) to be a gesture.

4. The handheld fluid transfer apparatus according to claim 3, wherein the evaluation device (4) is configured to access a motion data library memory, which contains predetermined motion patterns in the form of motion pattern data, contained in a database of motion patterns, and the evaluation device is configured to compare the at least one motion data sequence, or any data derived therefrom, with the predetermined motion patterns.

5. The handheld fluid transfer apparatus according to claim 1, wherein the user interface device comprises at least one conventional input device (13) for providing further input data to the control apparatus, the at least one conventional input device being selected from the group containing a mechanical button, a touch-sensitive button, a dial wheel, a selection rocker, a switch, a lever, a touchscreen, and wherein the control apparatus (2) is configured to determine control data in dependence on the input data and in dependence on the further input data received from the at least one conventional input device (13).

6. The handheld fluid transfer apparatus according to claim 1, wherein the fluid transfer apparatus is configured to provide a character recognition system, where the at least one motion data sequence is interpreted by the evaluation device (4) to be at least one character or a string.

7. The handheld fluid transfer apparatus according to claim 6, wherein the evaluation device (4) is configured to interpret the at least one character, recognized by the evaluation device, to be the input data, which is then stored in a memory of the fluid transfer apparatus or provided for a transfer to an external data processing apparatus.

8. The handheld fluid transfer apparatus according to claim 1, which comprises a communication apparatus (9) for allowing the transfer of data between the handheld fluid transfer apparatus and an external apparatus, and the handheld fluid transfer apparatus being configured to send the at least one motion data sequence to the external apparatus and to receive input data, determined in dependence on said at least one motion data sequence, from the external apparatus.

9. The handheld fluid transfer apparatus according to claim 1, wherein the motion sensor device (6) is configured for measuring a three-dimensional motion in the space defined by the three axis x, y and z of a Cartesian coordinate system.

10. The handheld fluid transfer apparatus according to claim 9, wherein the motion sensor device (6) is configured for measuring a three-dimensional acceleration in the space defined by the three axis x, y and z of a Cartesian coordinate system.

11. The handheld fluid transfer apparatus according to claim 1, wherein the motion sensor device (6) is configured for measuring the angular rates around the three rotational axis x, y and z of a Cartesian coordinate system.

12. The handheld fluid transfer apparatus according to claim 1, wherein the motion sensor device (6) comprises at least two motion sensors (7; 7'), which are arranged at different positions of the fluid transfer apparatus.

13. Laboratory system (100) for controlling at least one handheld fluid transfer apparatus (1"), the at least one handheld fluid transfer apparatus being configured for performing a fluid transfer process on a fluid laboratory sample and being more particularly a pipette or repeater pipette,
the at least one handheld fluid transfer apparatus comprising a control apparatus (2), which comprises a data processor (3) capable to execute a control program for controlling at least one electronically controllable function of the handheld fluid transfer apparatus using input data,
the at least one handheld fluid transfer apparatus comprising a user interface device (5) for receiving user input, the user interface device comprising a motion sensor device (6) for measuring motion data of the handheld fluid transfer apparatus and for providing at least one motion data sequence, which contains subsequently measured motion data,
the at least one handheld fluid transfer apparatus comprising a communication device (9) for sending the at least one motion data sequence to at least one external data processing apparatus, and for receiving the input data from the at least one external data processing apparatus,
the laboratory system comprising the at least one external data processing apparatus (50),
the at least one external data processing apparatus comprising a motion data memory (58) for storing the at least one motion data sequence,
the at least one external data processing apparatus comprising an evaluation device (54) being configured to determine the input data in dependence on the evaluation of the at least one motion data sequence, and
the at least one external data processing apparatus comprising a communication device (59) for receiving the at least one motion data sequence from the at least one handheld fluid transfer apparatus, and for sending the input data to the at least one handheld fluid transfer apparatus,
wherein the user interface device (5) is configured to provide a motion input mode, which, when active, allows that a user input via the motion sensor device (6) of the user interface device (5) of the fluid transfer apparatus is measured, while a user input via the motion sensor device (6) is not measured, when the motion input mode is inactive, and
wherein the user interface device (5) comprises an activity input device (14) for letting the user influence the activity or inactivity of a motion input mode of the fluid transfer apparatus.

14. Method (200) for operating the handheld fluid transfer device, in particular the handheld fluid transfer device (1; 1') according to any one of claims 1 to 12, or of the laboratory system of claim 13, comprising the steps:
receiving user input by measuring motion data of the motion of the handheld fluid transfer apparatus, when the same is moved by a user, and providing at least one motion data sequence, which contains subsequently measured motion data, (201)
storing the at least one motion data sequence in a motion data memory, (202)
determine the input data in dependence on the evaluation of the at least one motion data sequence, (203) and
controlling at least one electronically controllable function of the handheld fluid transfer apparatus using the input data, (204).

* * * * *